US012776062B2

(12) United States Patent
Iizuka

(10) Patent No.: US 12,776,062 B2
(45) Date of Patent: Oct. 27, 2026

(54) SPATIAL POSITIONING APPARATUS, RECORDING MEDIUM, AND SPATIAL POSITIONING METHOD

(71) Applicant: CASIO COMPUTER CO., LTD., Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 510 days.

(21) Appl. No.: 17/943,077

(22) Filed: Sep. 12, 2022

(65) Prior Publication Data

US 2023/0084125 A1 Mar. 16, 2023

(30) Foreign Application Priority Data

Sep. 16, 2021 (JP) ................................ 2021-151353

(51) Int. Cl.

| | |
|---|---|
| ***G06T 7/73*** | (2017.01) |
| ***G06T 7/13*** | (2017.01) |
| ***G06T 7/50*** | (2017.01) |
| ***G06T 7/62*** | (2017.01) |

(52) U.S. Cl.

CPC .................. *G06T 7/73* (2017.01); *G06T 7/13* (2017.01); *G06T 7/50* (2017.01); *G06T 7/62* (2017.01); *G06T 2207/20164* (2013.01); *G06V 2201/07* (2022.01)

(58) Field of Classification Search

None

See application file for complete search history.

(56) References Cited

U.S. PATENT DOCUMENTS

| | | | |
|---|---|---|---|
| 7,529,387 B2 | 5/2009 | Kotake et al. | |
| 2008/0075324 A1 | 3/2008 | Sato et al. | |
| 2011/0157179 A1 | 6/2011 | Fahn et al. | |
| 2012/0127323 A1 | 5/2012 | Kasuya et al. | |
| 2013/0308305 A1 | 11/2013 | Arndt et al. | |
| 2015/0131079 A1* | 5/2015 | Heinonen .......... | G06Q 10/0631 356/4.01 |
| 2016/0180536 A1 | 6/2016 | Yamaguchi | |

(Continued)

FOREIGN PATENT DOCUMENTS

| | | |
|---|---|---|
| CN | 108198216 A | 6/2018 |
| CN | 112013850 A | 12/2020 |

(Continued)

OTHER PUBLICATIONS

Translation for JP 2015-158461 (Year: 2015).*

(Continued)

*Primary Examiner* — Lennin R Rodriguezgonzalez

(74) *Attorney, Agent, or Firm* — Fitch, Even, Tabin & Flannery LLP

(57) ABSTRACT

An information processing apparatus comprises a processing unit that acquires, based on an image captured by an imaging unit and including an identifier disposed in a space, a plurality of positions on an outline of a shape of the identifier in an image coordinate system, and determines a position of the imaging unit, based on the plurality of positions on the outline of the shape of the identifier in the image coordinate system and positions on the outline of the shape of the identifier in a world coordinate system.

7 Claims, 17 Drawing Sheets

(56) References Cited

U.S. PATENT DOCUMENTS

| | | | |
|---|---|---|---|
| 2017/0243374 | A1 | 8/2017 | Matsuzawa |
| 2018/0068158 | A1 | 3/2018 | Hiroi et al. |
| 2018/0083703 | A1 | 3/2018 | Iizuka et al. |
| 2019/0281266 | A1 | 9/2019 | Urano |
| 2020/0012877 | A1 | 1/2020 | Kotake et al. |
| 2020/0342625 | A1 | 10/2020 | Lerman et al. |

FOREIGN PATENT DOCUMENTS

| | | | |
|---|---|---|---|
| CN | 112013858 | A | 12/2020 |
| CN | 113390426 | A | 9/2021 |
| JP | 2005315746 | A | 11/2005 |
| JP | 2015-158461 | A | 9/2015 |
| JP | 2019-132673 | A | 8/2019 |

OTHER PUBLICATIONS

Translation for JP 2019-132673 (Year: 2019).*
JPO; Application No. 2021-151353; Notice of Reasons for Refusal dated Sep. 3, 2024.
U.S. Appl. No. 17/943,055; Office Action mailed May 1, 2025.
U.S. Appl. No. 17/943,055; Office Action mailed Jan. 13, 2025.
CNIPA; Application No. 202211107202.7; Office Action dated Sep. 9, 2024.
CNIPA; Application No. 202211107239.X; Office Action dated Sep. 14, 2024.
U.S. Appl. No. 17/943,055; Office Action mailed Oct. 1, 2025.
USPTO; U.S. Appl. No. 17/943,055; Office Action mailed May 20, 2026.

* cited by examiner

FIG. 6

| | 71 WORLD COORDINATE SYSTEM | | |
|---|---|---|---|
| IDENTIFICATION NUMBER | x | y | Z |
| 5a | 2500 | 2700 | 5000 |
| 5b | 2500 | 1300 | 5000 |
| ... | | | |
| 6a | 1000 | 3500 | 5000 |
| 6b | 1000 | 2500 | 5000 |
| 6c | 1000 | 1500 | 5000 |
| 6d | 1000 | 500 | 5000 |
| ... | | | |
| 6g | 2000 | 1500 | 5000 |
| ... | | | |
| 6p | 4000 | 500 | 5000 |

FIG. 11

| | IMAGE COORDINATE SYSTEM | | | | WORLD COORDINATE SYSTEM | | | |
|---|---|---|---|---|---|---|---|---|
| | IDENTIFICATION NUMBER | x | y | | IDENTIFICATION NUMBER | x | y | z |
| IN-IMAGE MARKER POSITIONS 51 | M1 | 50.5 | 39.0 | IN-WC-SYSTEM MARKER KNOWN POSITIONS 52 | 5a | 2500 | 2700 | 5000 |
| | M2 | 50.3 | 26.8 | | 5b | 2500 | 1300 | 5000 |
| | ... | | | | ... | | | |
| IN-IMAGE IDENTIFIER POSITIONS 61 | L1 | 19.7 | 45.2 | IN-WC-SYSTEM IDENTIFIER KNOWN POSITIONS 62 | – | – | – | – |
| | L2 | 24.3 | 35.5 | | – | – | – | – |
| | L3 | 29.6 | 27.7 | | – | – | – | – |
| | L4 | 26.6 | 24.9 | | – | – | – | – |
| | ... | | | | ... | | | |
| | L7 | 43.1 | 28.5 | | – | – | – | – |
| | ... | | | | – | | | |
| | L16 | 65.2 | 25.2 | | – | – | – | – |

FIG. 12

| | WORLD COORDINATE SYSTEM | | | | | IMAGE COORDINATE SYSTEM | | |
|---|---|---|---|---|---|---|---|---|
| | IDENTIFICATION NUMBER | x | y | z | | IDENTIFICATION NUMBER | x | y |
| IN-WC-SYSTEM IDENTIFIER KNOWN POSITIONS 62 | 6a | 1000 | 3500 | 5000 | CALCULATIVE IDENTIFIER POSITIONS 63 | 6a-C | 34.5 | 24.8 |
| | 6b | 1000 | 2500 | 5000 | | 6b-C | 29.8 | 27.6 |
| | 6c | 1000 | 1500 | 5000 | | 6c-C | 24.8 | 34.5 |
| | 6d | 1000 | 500 | 5000 | | 6d-C | 19.5 | 45.4 |
| | ... | | | | | ... | | |
| | 6g | 2000 | 1500 | 5000 | | 6g-C | 40.9 | 34.8 |
| | ... | | | | | ... | | |
| | 6p | 4000 | 500 | 5000 | | 6p-C | 79.8 | 44.8 |

FIG. 14

IN-WC-SYSTEM IDENTIFIER KNOWN POSITIONS 62

| WORLD COORDINATE SYSTEM | | | |
|---|---|---|---|
| IDENTIFICATION NUMBER | x | y | z |
| 6a | 1000 | 3500 | 5000 |
| 6b | 1000 | 2500 | 5000 |
| 6c | 1000 | 1500 | 5000 |
| 6d | 1000 | 500 | 5000 |
| ... | | | |
| 6g | 2000 | 1500 | 5000 |
| ... | | | |
| 6o | 4000 | 1500 | 5000 |
| 6p | 4000 | 500 | 5000 |

CALCULATIVE IDENTIFIER POSITIONS 63

| IMAGE COORDINATE SYSTEM | | |
|---|---|---|
| IDENTIFICATION NUMBER | x | y |
| 6a-C | 34.5 | 24.8 |
| 6b-C | 29.8 | 27.6 |
| 6c-C | 24.8 | 34.5 |
| 6d-C | 19.5 | 45.4 |
| ... | | |
| 6g-C | 40.9 | 34.8 |
| ... | | |
| 6o-C | 74.8 | 34.8 |
| 6p-C | 79.8 | 44.8 |

IN-IMAGE IDENTIFIER POSITIONS 61

| IMAGE COORDINATE SYSTEM | | |
|---|---|---|
| 1 | x | y |
| L4 | 34.9 | 24.9 |
| L3 | 29.6 | 27.7 |
| L2 | 24.3 | 35.5 |
| L1 | 19.7 | 45.2 |
| ... | | |
| L6 | 41.2 | 35.1 |
| ... | | |
| L14 | 75.1 | 35.3 |
| L13 | 79.3 | 45.2 |

FIG. 19

| | IN-WC-SYSTEM IDENTIFIER KNOWN POSITIONS | | | | IN-WC-SYSTEM OUTLINE KNOWN POSITIONS 1 | | | | IN-WC-SYSTEM OUTLINE KNOWN POSITIONS 2 | | | | IN-WC-SYSTEM OUTLINE KNOWN POSITIONS 3 | | | | IN-WC-SYSTEM OUTLINE KNOWN POSITIONS 4 | | | |
|---|---|---|---|---|---|---|---|---|---|---|---|---|---|---|---|---|---|---|---|---|
| | id | x | y | y | id | x | y | y | id | x | y | y | id | x | y | y | id | x | y | y |
| | 100 | | | | 101 | | | | 102 | | | | 103 | | | | 104 | | | |
| | 110 | | | | 111 | | | | 112 | | | | 113 | | | | 114 | | | |
| | ... | | | | | | | | | | | | | | | | | | | |

SPATIAL POSITIONING APPARATUS, RECORDING MEDIUM, AND SPATIAL POSITIONING METHOD

This application is based on and claims the benefit of priority from Japanese Patent Application No. 2021-151353, filed on 16 Sep. 2021, the content of which is incorporated herein by reference.

BACKGROUND OF THE INVENTION

Field of the Invention

The present invention relates to an information processing apparatus, a recording medium, and a positioning method for measuring a position.

Related Art

There is a known technique for estimating a position of a movable body or the like by means of a captured image.

Japanese Unexamined Patent Application, Publication No. 2005-315746 discloses a technique relating to an own position identification method for a movable body that autonomously runs in an environment in which a plurality of markers are disposed at upper locations in an indoor space. According to the own position identification method of Japanese Unexamined Patent Application, Publication No. 2005-315746, the positions of the plurality of markers disposed on a ceiling or a similar place are registered in advance. The own position identification is performed in the following manner. Marker candidate points are extracted from an image of the ceiling captured from the movable body, and two-dimensional candidate point coordinates are calculated. A plurality of virtual points are arbitrarily set in a region where the movable body is able to travel. Two-dimensional coordinates of the markers in an image acquired when the movable body is present at the virtual point are derived from registered three-dimensional positions. The candidate point coordinates are compared with the two-dimensional coordinates. Two-dimensional coordinates that are most approximate to the candidate point coordinates are determined, and the virtual point at which the movable body is present and which corresponds to the determined two-dimensional coordinates is estimated as the own position.

SUMMARY OF THE INVENTION

An aspect of the present invention is directed to an information processing apparatus comprising one or more processors. The one or more processors acquire, based on an image captured by an imaging unit and including an identifier disposed in a space, a plurality of positions on an outline of a shape of the identifier in an image coordinate system, and determine a position of the imaging unit, based on the plurality of positions on the outline of the shape of the identifier in the image coordinate system and positions on the outline of the shape of the identifier in a world coordinate system.

BRIEF DESCRIPTION OF THE DRAWINGS

FIG. 6 is a table showing, as an example, positions of the markers and identifiers according to the embodiment;

FIG. 11 is a table showing a list of in-image marker positions, in-image identifier positions, in-WC-system marker known positions, and in-WC-system identifier known positions according to the embodiment;

FIG. 12 is a table showing a relationship between in-WC-system identifier known positions and calculative identifier positions according to the embodiment;

FIG. 14 illustrates an example of a table in which in-image identifier positions are associated with in-WC-system identifier known positions, based on the in-image identifier positions and calculative identifier positions according to the embodiment;

FIG. 19 is an example of a table of in-WC-system identifier known positions in a case where an identifier according to the embodiment has a quadrangular shape;

DETAILED DESCRIPTION OF THE INVENTION

Embodiments of the present invention will be described with reference to the drawings.

(Positioning System 1)

Figure 1:
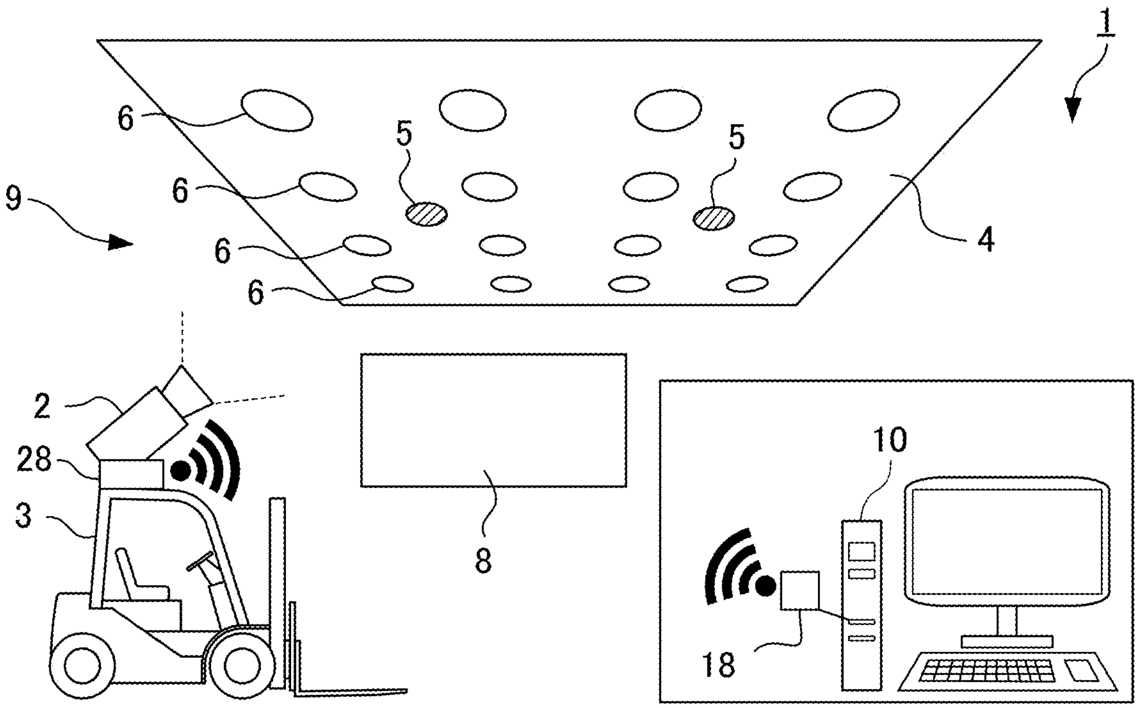
FIG. 1 is a schematic diagram illustrating an overall configuration of a positioning system including an information processing apparatus according to an embodiment of the present invention.
Figure 2:
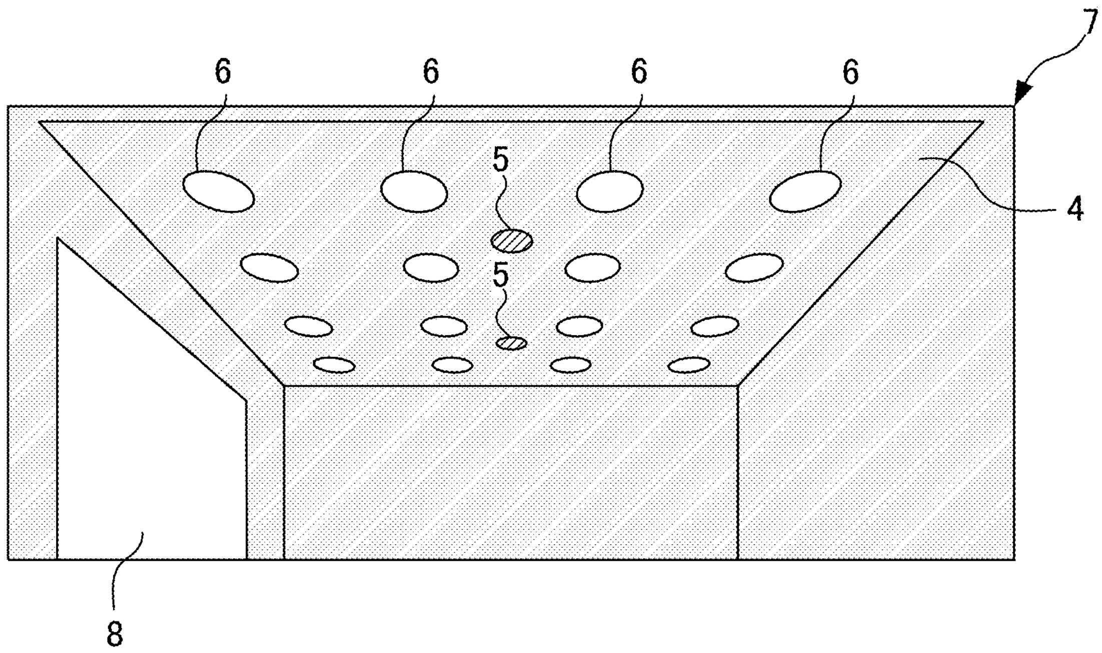
FIG. 2 is a schematic diagram illustrating an image of a ceiling having thereon markers and identifiers that are identifiable by the information processing apparatus according to the embodiment.

First, a positioning system 1 will be outlined with reference to FIG. 1. FIG. 1 is a schematic diagram illustrating an overall configuration of the positioning system 1 including an information processing apparatus 10. FIG. 2 is a schematic diagram illustrating an image 7 of a ceiling 4 having thereon markers 5 and identifiers 6 that are identifiable by the information processing apparatus 10.

As illustrated in FIG. 1, the positioning system 1 includes an imaging unit 2 mounted to not a building 9 including the ceiling but a movable body 3, markers 5 disposed inside the building 9 where the movable body 3 travels, and the information processing apparatus 10 for measuring a position of the movable body 3 based on the images 7 captured by the imaging unit 2.

The imaging unit 2 captures images 7 in a state where the movable body 3 has the imaging unit 2 mounted thereto. The imaging unit 2 consecutively captures images of the ceiling 4 above the imaging unit 2 at a predetermined frame rate, thereby obtaining a plurality of temporally consecutive images 7 of the ceiling 4.

The imaging unit 2 is connected to a communication device 28 for communicating with the information processing apparatus 10. The images 7 captured by the imaging unit 2 or various pieces of information based on the images 7 are transmitted to the information processing apparatus 10 via the communication device 28. In this example, the movable body 3 having the imaging unit 2 mounted thereto is a work vehicle such as a forklift.

The marker 5 is an object including either one of a device and an indicator that enable acquisition of three-dimensional position information in a world coordinate system 70 in which the marker 5 is disposed from a database 19, by means of data transmitted by the marker 5 per se, or by way of image processing on an image of the marker 5 captured by the imaging unit 2.

The marker 5 is, for example, a light emitting device capable of controlling light emitting modes thereof, such as a color of visible light and timing for emitting visible light. The marker 5 optically transmits identification information by, for example, changing the color of visible light or blinking visible light according to predetermined patterns. The marker 5 may emit near infrared light instead of visible light. In other words, it is only necessary for the marker 5 to emit light having a wavelength within a light wave band that can be captured by a camera.

A plurality of markers 5 are provided in order to specify the position and orientation of the imaging unit 2. In the example illustrated in FIG. 1, two markers 5 are provided at two locations on the ceiling 4. It should be noted that the markers 5 do not necessarily have to be disposed on the ceiling 4, and may be disposed in a space in the building 9 where the movable body 3 travels and the imaging unit 2 can capture images.

The identifiers 6 are, for example, a plurality of light sources or lighting devices installed on the ceiling 4. In the present specification, the identifiers 6 indicate a region that can be specified from the captured image 7 by way of image processing. The region is specified based on, for example, luminance, chromaticity, or the like.

The building 9 has a window 8. In a case where the window 8 is captured in the image 7, the window 8 may satisfy a luminance condition depending on a time zone. In this respect, image processing is executed such that control is performed so as not to process the region of the window 8 as the identifiers 6. The identifiers 6 of the present embodiment are not limited to auto-luminous objects. A reflective white material that reflects light, a green colored region existing on a brown plane, or the like may be specified as the identifier 6 from the image 7 by way of image processing.

The information processing apparatus 10 measures a position of the imaging unit 2 based on known positions of the markers 5 and the identifiers 6, positions 51 of the markers 5 in the image 7 (hereinafter referred to as the in-image marker positions 51), and the positions 61 of the identifiers 6 in the image 7 (hereinafter referred to as the in-image identifier positions 61). The known positions of the markers 5 and the identifiers 6 may be specified from, for example, a design drawing in advance, or may be specified by another positioning device. In the present specification, the position of each marker 5 and the position of each identifier 6 are represented in terms of the three-dimensional world coordinate system 70.

The information processing apparatus 10 is connected to a communication device 18 for communicating with the imaging unit 2. Establishing communication between the communication device 18 of the information processing apparatus 10 and the communication device 28 of the imaging unit 2 allows the information processing apparatus 10 to acquire the images 7 from the imaging unit 2.

(Hardware Configuration)

Figure 3:
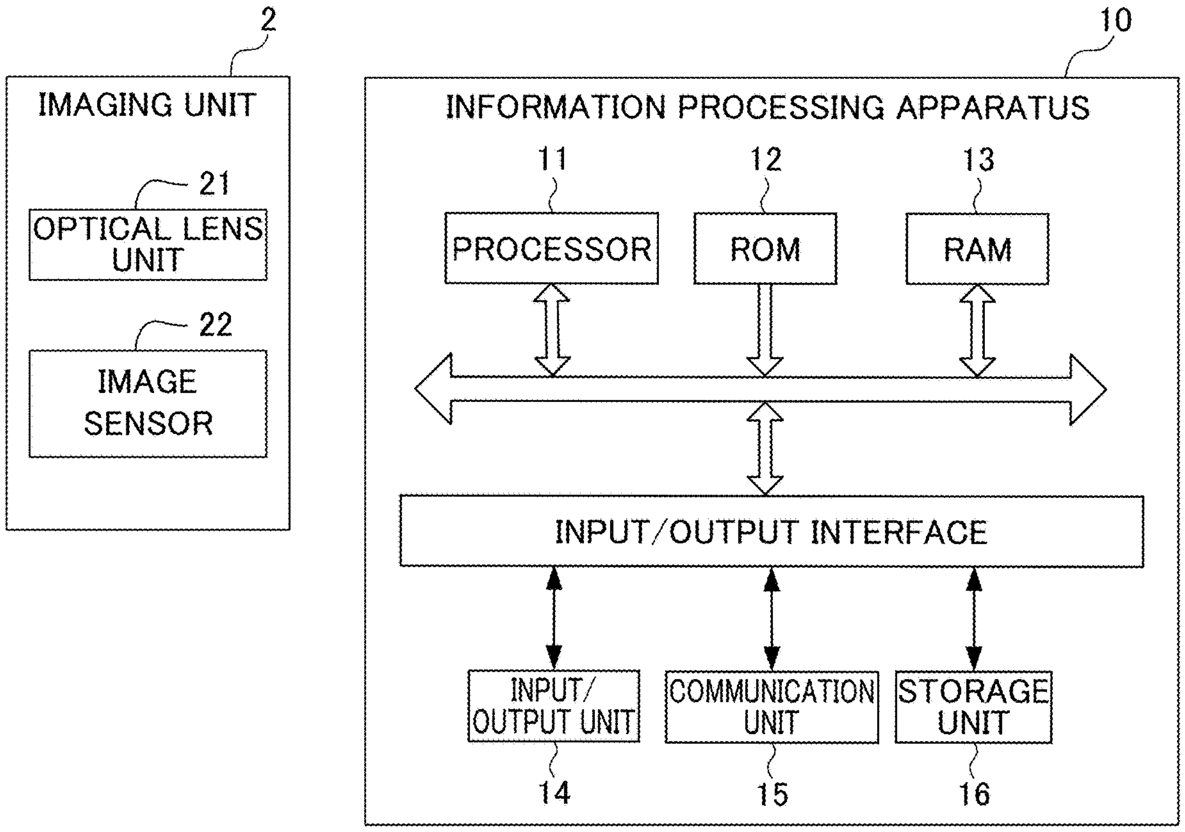
FIG. 3 is a block diagram illustrating a hardware configuration of the information processing apparatus and a hardware configuration of an imaging unit according to the embodiment.

FIG. 3 is a block diagram illustrating a hardware configuration of the information processing apparatus 10 and a hardware configuration of the imaging unit 2.

In the example illustrated in FIG. 3, the information processing apparatus 10 includes a processor 11, a read only memory (ROM) 12, a random access memory (RAM) 13, an input/output unit 14, a communication unit 15, and a storage unit 16.

The processor 11 performs various calculations and processing. The processor 11 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 11 is a combination of two or more of the foregoing components. Further, the processor 11 may be a combination of two or more of the foregoing components and a hardware accelerator or the like.

The processor 11, the ROM 12, and the RAM 13 are connected to one another via a bus. The processor 11 executes various types of processing in accordance with a program recorded in the ROM 12 or a program loaded to the RAM 13. A part or the entirety of the program may be incorporated in the circuitry of the processor 11.

The input/output unit 14 includes a keyboard, various buttons, a microphone, and the like, and inputs various kinds of information according to a user's instruction operation. The input/output unit 14 further includes a display, a speaker, and the like, and outputs the captured images 7 and sounds. The input/output unit 14 includes an information terminal with a touch panel. The communication unit 15 is a network interface for communicating with the imaging unit 2 and other devices via the communication device 18. The storage unit 16 is an area for storing various kinds of information such as the captured images 7 and known information.

Next, an example of the hardware configuration of the imaging unit 2 will be described. The imaging unit 2 includes an optical lens unit 21 and an image sensor 22.

The optical lens unit 21 includes a lens that condenses light in order to capture an image of a subject, such as a focus lens and a zoom lens. The focus lens is for forming a subject image on a light-receiving surface of the image sensor 22. The zoom lens is for freely changing the focal length within a certain range. The optical lens unit 21 is optionally provided with peripheral circuits for adjusting setting parameters such as focus, exposure, and white balance.

The image sensor 22 includes, for example, a photoelectric conversion element, an analog front end (AFE), etc. The photoelectric conversion element includes, for example, a complementary metal oxide semiconductor (CMOS) type photoelectric conversion element. An image of a subject is incident on the photoelectric conversion element from the optical lens unit 21. In response, the photoelectric conversion element photoelectrically converts (i.e., captures) the image of the subject, accumulates image signals for a certain period of time, and sequentially supplies the accumulated image signals to the AFE as analog signals. The AFE performs various signal processing such as analog/digital (A/D) conversion processing on the analog image signals. By way of the various signal processing, digital signals are generated, and the image 7 is output in the form of output signals from the imaging unit 2.

(Functional Configuration of Information Processing Apparatus)

Figure 4:
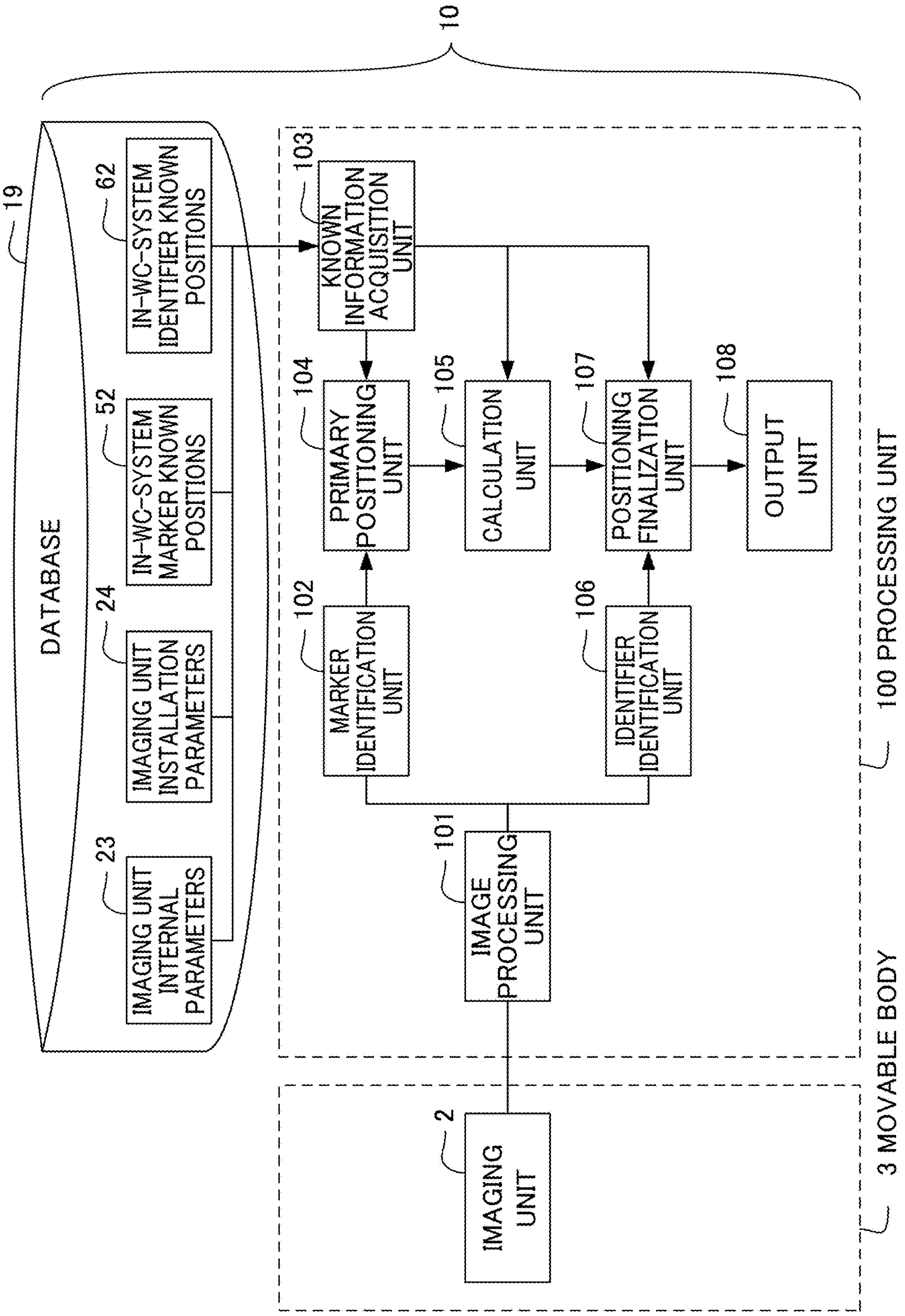
FIG. 4 is a functional block diagram illustrating a functional configuration of the information processing apparatus according to the embodiment.

FIG. 4 is a functional block diagram illustrating a functional configuration of the information processing apparatus 10. FIG. 4 illustrates the functional configuration, together with relationships in a flow of processing.

The information processing apparatus 10 performs various kinds of control by means of a processing unit 100 that is implemented by the processor 11 executing arithmetic processing based on predetermined programs.

The processing unit 100 includes, on a function-to-function basis, an image processing unit 101, a marker identification unit 102, a known information acquisition unit 103, a primary positioning unit 104, a calculation unit 105, an identifier identification unit 106, a positioning finalization unit 107, and an output unit 108.

The image processing unit 101 acquires the image 7 and performs preprocessing such as distortion correction. The marker identification unit 102 is capable of acquiring the in-image marker positions 51 by executing processing for identifying the markers 5 from the image 7.

The known information acquisition unit 103 acquires, from the database 19, preset known information such as imaging unit internal parameters 23, imaging unit installation parameters 24, known marker positions 52 in the world coordinate system 70 (hereinafter referred to as the in-WC-system marker known positions 52), and known identifier positions 62 in the world coordinate system 70 (hereinafter referred to as the in-WC-system identifier known positions 62). The database 19 may be built in the storage unit 16 of the information processing apparatus 10, or may be built in a server outside the information processing apparatus 10.

The primary positioning unit 104 performs primarily positioning of the imaging unit 2 based on the in-image marker positions 51 acquired from the image 7 and the in-WC-system marker known positions 52 acquired from the database 19 to thereby acquire a position of the imaging unit 2 in the world coordinate system 70 (hereinafter referred to as the in-WC-system imaging primary position). The in-WC-system imaging primary position includes the position where the imaging unit 2 is and the direction in which the imaging unit 2 is oriented.

The calculation unit 105 performs, a projection calculation processing on an assumption that the in-WC-system identifier known positions 62 are projected onto an image 7 captured by the imaging unit 2, thereby calculating the projected positions. The identifier identification unit 106 performs identification processing by associating the positions 61 of the identifiers 6 acquired from captured image 7 by way of image processing (hereinafter, referred to as the in-image identifier positions 61) with the in-WC-system identifier known positions 62. In the present embodiment, this associating processing is performed to calculate the position of the movable body 3 as a PnP problem including the in-image identifier positions 61 and the in-WC-system identifier known positions 62, in addition to the in-image marker positions 51 and the in-WC-system marker known positions 52. Thus, even in a case where a small number of markers 5 (e.g., two markers 5) are disposed, the position of the movable body 3 is calculated with high accuracy by utilizing the identifiers 6 such as existing lighting devices.

The positioning finalization unit 107 performs, based on, for example, the primary position of the imaging unit 2, the in-WC-system marker known positions 52, and the in-WC-system identifier known positions 62, processing for determining and acquiring the finalized position of the imaging unit 2 in the world coordinate system 70 (hereinafter referred to as the in-WC-system imaging unit determined position). The in-WC-system imaging unit determined position includes the position where the imaging unit 2 is and the direction in which the imaging unit 2 is oriented. The output unit 108 performs processing for outputting the results of the positioning.

In this example, the information processing apparatus 10 is installed at a location away from the imaging unit 2, but the present invention is not limited to this configuration. For example, the information processing apparatus 10 may be configured to be mounted to the movable body 3 or the imaging unit 2.

Figure 5:
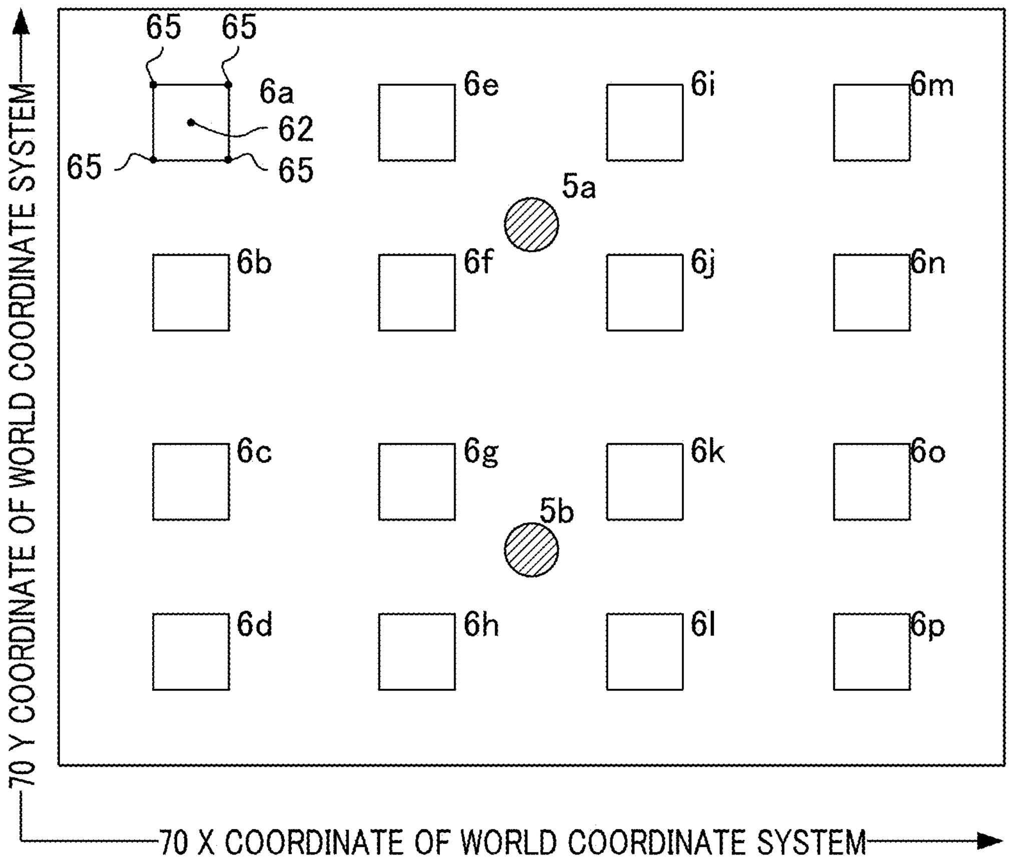
FIG. 5 is a schematic diagram illustrating, as an example, the positions of markers and identifiers according to the embodiment.

FIG. 5 is a schematic planar diagram illustrating the markers 5 and the identifiers 6. In FIG. 5, the positional relationship between the markers 5 and the identifiers 6 disposed on the ceiling 4 is illustrated in a plan view. In this example, the two markers 5 are assigned with identification numbers 5*a* and 5*b*, and are each processed as an individual marker. In the present embodiment, the sixteen identifiers 6, which are lighting devices, are also assigned with identification numbers 6*a* to 6*p*, and are each processed as an individual identifier.

Each identifier 6 is a ceiling light having a quadrangular shape, such as a square shape or a rectangular shape. For each identifier 6, the in-WC-system identifier known position 62 indicating the center position of the identifier 6 and a plurality of in-WC-system outline known positions 65 indicating positions on the outline defining the shape of the identifier 6 are registered as known information in the database 19. The in-WC-system identifier known position 62 is set at, for example, the center of gravity of the identifier 6 or a point of intersection of lines connecting the in-WC-system outline known positions 65. The in-WC-system outline known positions 65 are positions residing along the contour of the identifier 6 and representing the characteristics of the shape of the identifier 6. In the present embodiment, the in-WC-system outline known positions 65 are set at locations corresponding to the vertexes of a polygon. As mentioned above, the in-WC-system identifier known position 62 and the in-WC-system outline known positions 65 can be specified based on, for example, a design drawing of the building 9.

Here, examples of the in-WC-system identifier known position 62 will be described with reference to FIG. 6. FIG. 6 is a table showing, as an example, the positions of the markers 5 and the positions of the identifiers 6 in terms of the world coordinate system 70. FIG. 6 shows world coordinates as three-dimensional positions corresponding to the markers 5 denoted by the identification numbers 5*a* and 5*b* and world coordinates as three-dimensional positions corresponding to the center position of each of the identifiers 6 denoted by the identification numbers 6*a* to 6*p*. Here, for the sake of convenience, one of the corners of the ceiling 4 is defined as the origin, the x-axis and the y-axis are defined in a plan view, the vertical direction is defined as the z-axis, and the floor surface is defined as the origin for the Z-axis. In a state in which the database 19 contains, as the known information, the three-dimensional positions of the markers 5 and those of the identifiers 6 registered therein in advance, a process of specifying the position of the imaging unit 2 is performed based on the images 7 of the ceiling 4 captured by the imaging unit 2.

(Positioning Process)

Figure 7:
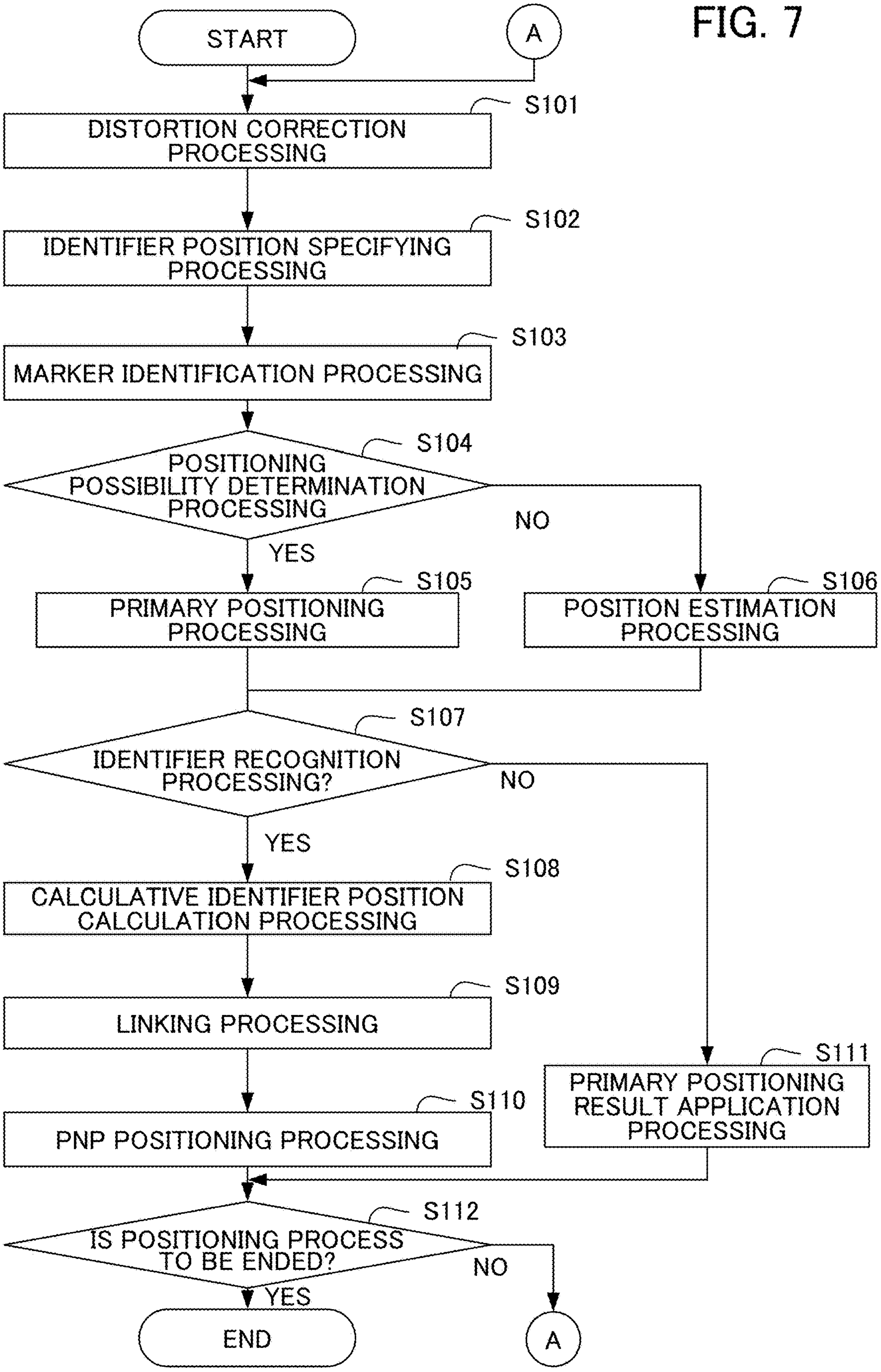
FIG. 7 is a flowchart illustrating a flow of a positioning process executable by the information processing apparatus according to the embodiment.

Next, a positioning process using the images 7 will be described. FIG. 7 is a flowchart illustrating a flow of the positioning process that is performed by the information processing apparatus 10 according to the present embodiment.

In response to a start of the positioning process, the processing unit 100 acquires the image 7 captured by the imaging unit 2, and performs distortion correction processing (Step S101). In the distortion correction processing, barrel aberration of the image 7 captured by, for example, a wide-angle lens is corrected.

After Step S101, the processing unit 100 performs processing for specifying the positions of the identifiers 6 (Step S102).

Figure 8:
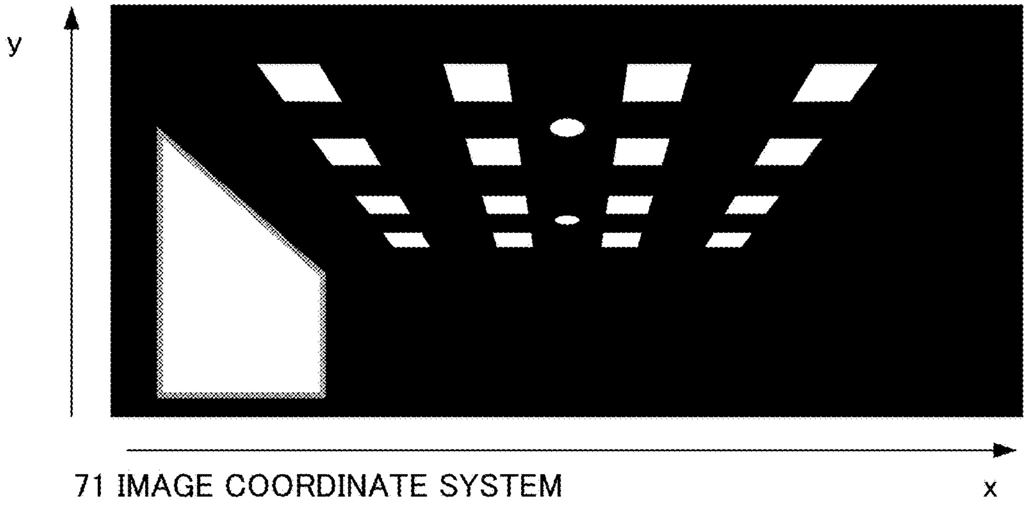
FIG. 8 is a schematic diagram illustrating processing for extracting high-luminance regions from a captured image according to the present embodiment.

An example of the processing for specifying the positions of the identifiers will be described with reference to FIGS. 8 and 9. FIG. 8 is a schematic diagram illustrating processing for extracting high-luminance regions from the captured image 7. As shown in FIG. 8, in order to specify the identifiers 6 from the captured image 7, the image processing unit 101 of the processing unit 100 performs, as pre-processing, binarizing of the captured image 7 based on a predetermined threshold value, and thereby whitens only high-luminance regions and blackens the other regions. As a result, regions having a high luminance as in a saturated region are extracted. However, in this state, the location of the window 8 is also extracted as a high-luminance region in a case of a time period with daylight, such as daytime.

Figure 9:
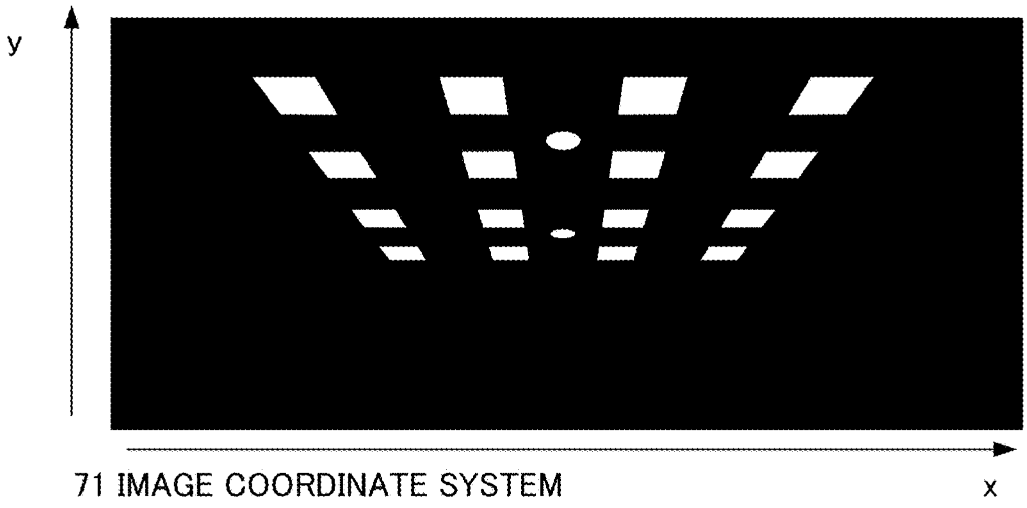
FIG. 9 is a schematic diagram illustrating processing for specifying, from extracted regions, identifiers to be used for positioning according to the embodiment.

FIG. 9 is a schematic diagram illustrating processing for specifying, from the regions extracted with respect to FIG. 8, the identifiers 6 to be used for positioning. As illustrated in FIG. 9, in order to exclude the region that originates from the window 8 and does not contribute to positioning, the image processing unit 101 performs filtering processing based on the actual shape, area, etc. of the extracted regions, and specifies only regions that highly provably correspond to the markers 5 and the identifiers 6. Subsequently, a region center position is acquired for each of the plurality of identifiers 6 by image processing, and the acquired region center positions are stored as the in-image identifier positions 61. The identifier identification unit 106 creates a list of the in-image identifier positions 61 of the identifiers 6. Here, one of the following values in the world coordinate system 70 is adopted as the center position, for example: the center of gravity of the region recognized to be the identifier 6, the averages of the x, y, and z coordinates, and the intermediate value between the maximum and minimum coordinates. However, the center position is not limited to the foregoing values, and represents, as one position, the position of the identifier 6.

In the captured image 7, the identifiers 6 constitute, for example, high-luminance regions. In a case where the high-luminance regions have a polygonal shape as illustrated in FIG. 9, a plurality of in-image outline positions 64 are acquired for each of the identifiers 6. The in-image outline positions 64 indicate positions on the outline defining the shape of the identifier 6. The in-image outline positions 64 reside along the contour of the identifier 6 and represent characteristics of the shape of the identifier 6. For example, the locations of the vertexes are acquired as the in-image outline positions 64 by way of image processing. As the center position of the identifier 6, the center of gravity of the identifier 6 or a point of intersection of lines connecting the in-image outline positions 64 is acquired, for example. The center position of each identifier 6 is registered as the in-image identifier position 61.

The in-image identifier positions 61 in the captured image 7 are specified with reference to two-dimensional coordinates set on the captured image 7. In the present specification, the two-dimensional coordinate system on the captured image 7 is referred to as the image coordinate system 71.

FIG. 11 shows, as an example, a list of in-image identifier positions 61. The identifiers 6 to which the in-image identifier positions 61 as the center points of the regions in the captured image 7 have been given are assigned with primary identification numbers L1, L2, and so on. FIG. 11 shows an example in which the in-image identifier positions 61 have been set. At this stage, the positions of the plurality of identifiers 6 are merely specified from the captured image 7, and it is impossible to definitively determine which of the plurality of identifiers 6 corresponds to which of the identifiers 6*a* to 6*p* shown in FIG. 6. Thus, each of the plurality of identifiers 6 cannot be uniquely identified. Therefore, as shown in FIG. 11, at this point in time, the identifiers 6 are not yet liked to the in-WC-system identifier known positions 62.

Figure 10:
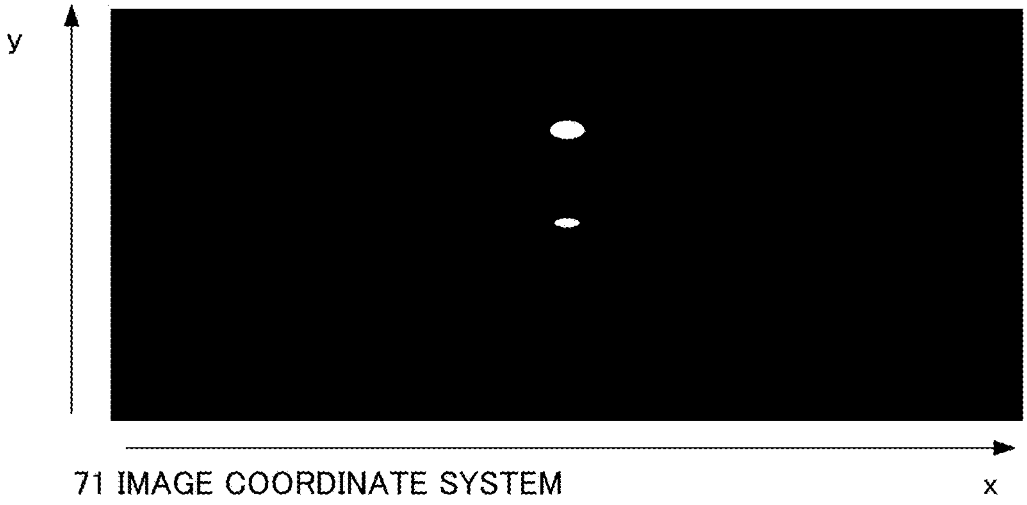
FIG. 10 is a schematic diagram for describing processing for specifying markers from a captured image according to the embodiment.

Next, the marker identification unit 102 performs marker identification processing (Step S103). FIG. 10 is a schematic diagram for describing processing for specifying the markers 5 from the captured image 7. As the marker identification processing, the marker identification unit 102 specifies the positions of the markers 5 from the captured image 7 by way of image processing.

FIG. 11 shows, as an example, a list of in-image marker positions 51 and in-WC-system marker known positions 52. The markers 5 having the in-image marker positions 51 given thereto are assigned with primary identification numbers M1, M2, and so on. Since the markers 5 have been identified, the in-image marker positions 51 denoted by M1 and M2 are linked to the markers 5*a* and 5*b* shown in FIG. 5.

An example of the marker identification processing will be described. The marker identification unit 102 determines a light emission pattern based on captured consecutive images 7, and compares the light emission pattern with a preset light emission pattern to specify the positions of the markers 5 in the captured images 7.

Next, the primary positioning unit 104 performs positioning possibility determination processing (Step S104). As the positioning possibility determination processing, for example, the primary positioning unit 104 determines whether two or more markers 5 are present in the captured image 7 and positioning can be performed based on the markers 5.

When it is determined that positioning can be performed based on the markers 5 (Step S104: YES), the primary positioning unit 104 performs primary positioning processing (Step S105).

An example of the primary positioning processing will be now described. As described above, since the markers 5*a* and 5*b* can be individually identified from the captured image 7, the primary positioning unit 104 acquires the in-WC-system marker known positions 52 of the markers 5*a* and 5*b* based on the correspondence shown in FIG. 11.

As the primary positioning processing, for example, the primary positioning unit 104 performs primary positioning of the imaging unit 2 by way of the PnP positioning processing, based on the in-image marker positions 51 and the in-WC-system marker known positions 52.

As is conventionally known, when positions of a group of points and positions in a captured image 7 are given, the position, the posture, and the like of the imaging unit 2 are determined by way of the PnP positioning processing. In a case where positioning is performed based on six points, the position and the imaging direction (an in-plane azimuth, an elevation angle) of the imaging unit 2 can be determined. Even in a case where the number of points is less than six, for example, when the imaging unit 2 is on a plane parallel to the ceiling 4 on which the markers 5 and the identifiers 6 are disposed, the position and elevation angle of the imaging unit 2 can be determined by way of positioning based on only two points, even though the resulting accuracy is not high.

Since the movable body 3 moves on the floor surface parallel to the ceiling 4, the primary positioning unit 104 can determine, by way of a P2P method, the in-WC-system imaging primary position that includes the primary position and elevation angle of the imaging unit 2. The primary positioning unit 104 determines the in-WC-system imaging primary position, which is the primary position of the imaging unit 2, by way of the P2P method and using the in-image marker positions 51 denoted by identification numbers M1 and M2 and the in-WC-system marker known positions 52 denoted by identification numbers 5*a* and 5*b* shown in FIG. 11.

In a case where the positioning cannot be performed based on the markers 5 (Step S104: NO), the primary positioning unit 104 performs position estimation processing (Step S106). As the position estimation processing, for example, the primary positioning unit 104 estimates the position of the imaging unit 2 based on a previously-acquired in-WC-system imaging unit determined position and a movement vector history, and defines the estimated position as a primary positioning result.

Next, the calculation unit 105 performs identifier recognition processing (Step S107). As the identifier recognition processing, for example, the calculation unit 105 determines whether or not an identifier 6 is present in the captured image 7.

When there is no identifier 6 in the captured image 7 (Step S107: NO), the primary positioning unit 104 performs primary positioning result application processing (Step S111). As the primary positioning result application processing, for example, the primary positioning unit 104 applies the primary positioning result as a determined positioning result.

When the identifiers 6 are present in the captured image 7 (Step S107: YES), the calculation unit 105 performs position calculation processing for the identifiers 6 (hereinafter, referred to as the identifier position calculation processing) (Step S108). The identifier position calculation processing is performed in the following manner, for example. On an assumption that the in-WC-system identifier known positions 62 are captured in an image 7 from the in-WC-system imaging primary position determined based on the primary positioning result, the calculating unit 105 calculates positions where the position of the in-WC-system identifier known positions 62 would appear on the captured image 7, in other words, positions 63 at which the in-WC-system identifier known positions 62 would be projected (hereinafter referred to as the calculative identifier positions 63).

This calculation is well-known processing for inversely calculating a position where an arbitrarily-designated three-dimensional point is drawn on an image, from the position and posture of the imaging unit 2. The calculation itself is a simple matrix calculation. Therefore, the projection will be implemented in an infinite view field, and the back side of the in-WC-system imaging unit position will also be plane-projected. Performing the PnP positioning processing in this state as it is will make the calculation illogical or cause a significant error. To address these inconveniences, the calculation according to the present embodiment is performed after sorting out only the identifiers 6 at the in-WC-system identifier known positions 62 that would be approximately within the imaging angle of view of an image captured from the in-WC-system imaging primary position determined by the primary positioning.

FIG. 12 shows the in-WC-system identifier known positions 62, which are known positions, and the calculative identifier positions 63, which are locations where the in-WC-system identifier known positions 62 would be drawn on the captured image 7. The calculative identifier position 63 calculated for the in-WC-system identifier known position 62 denoted by identification number 6*a* is denoted by identification number 6*a*-C.

The positioning finalization unit 107 performs linking processing (Step S109). As the linking processing, for example, the positioning finalization unit 107 associates the in-image identifier positions 61 with the calculative identifier positions 63, based on the positional relationship in one captured image, and then, links the identifiers 6 to the in-WC-system identifier known positions 62 based on which the calculated identifier positions 63 are determined.

Figure 13C:
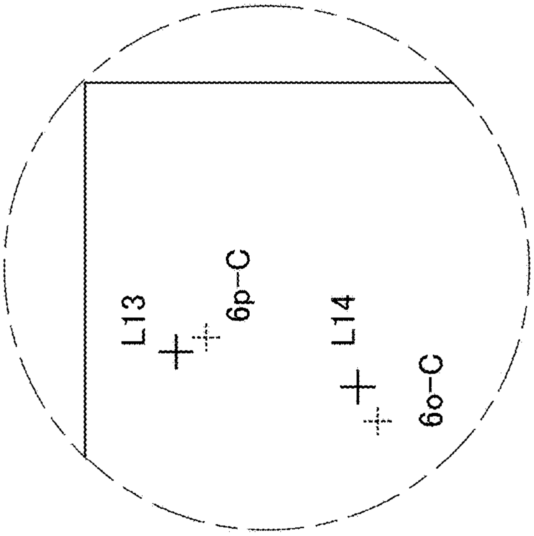
FIG. 13C is a diagram illustrating a relationship between calculative identifier positions and in-image identifier positions according to the embodiment in an image coordinate system.
Figure 13A:
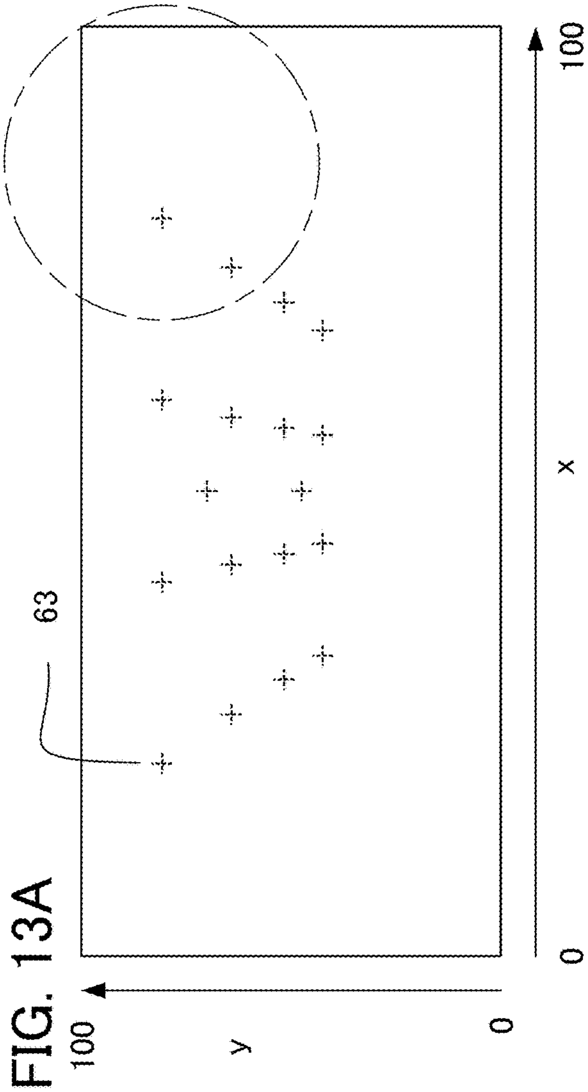
FIG. 13A is a diagram illustrating a relationship between calculative identifier positions and in-image identifier positions according to the embodiment in an image coordinate system.
Figure 13B:
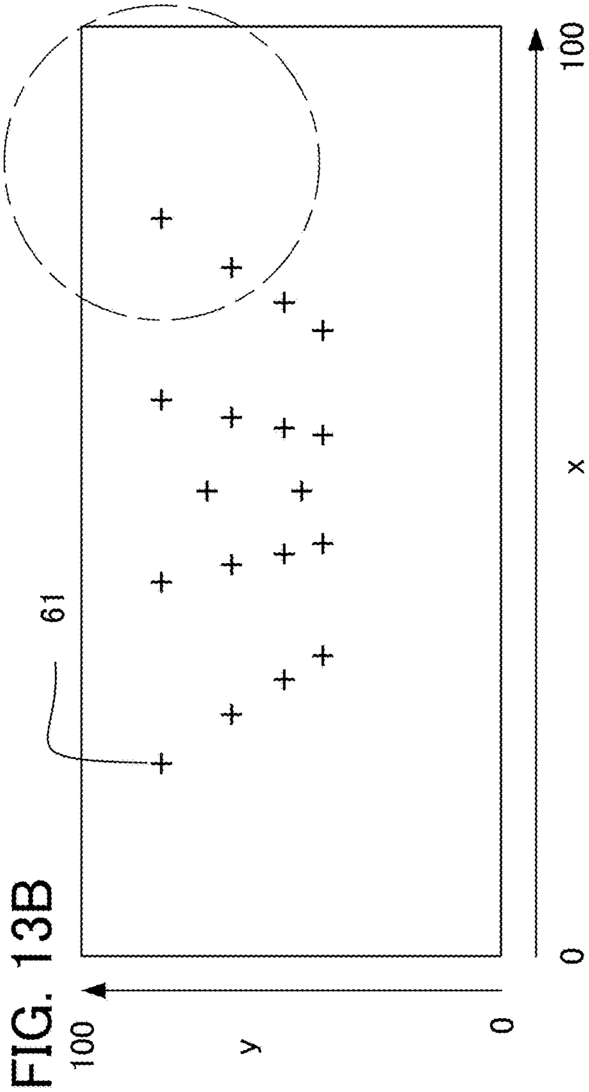
FIG. 13B is a diagram illustrating a relationship between calculative identifier positions and in-image identifier positions according to the embodiment in an image coordinate system.

FIG. 13 illustrates a relationship between the calculative identifier positions 63 and the in-image identifier positions 61. As illustrated in FIG. 13A, not only the in-WC-system marker known positions 52, but also the calculative identifier positions 63 on the captured image 7 that correspond to the in-WC-system identifier known positions 62 are plotted on the image coordinate system 71. On the other hand, as illustrated in FIG. 13B, not only the in-image marker positions 51, but also the in-image identifier positions 61 corresponding to the identifiers 6 are plotted on the image coordinate system 71. FIG. 13C illustrates, on an enlarged scale, an upper right portion of the image coordinate system 71 in a state in which FIGS. 13A and 13B are superimposed on each other. The calculative identifier positions 63 and the in-image identifier positions 61 are similar to each other but deviate from each other to some extent due to an error in the positioning. Among these points, ones that are closest to, or in proximity to, each other and that are in a positional relationship not disrupting the mutual positional relationship are linked to each other. In FIG. 13C, the calculative identifier position 63 denoted by identification number 6*p*-C and the in-image identifier position 61 denoted by identification number L13 are plotted in proximity to each other, and the calculative identifier position 63 denoted by identification number 6*o*-C and the in-image identifier position 61 denoted by identification number L14 are plotted in proximity to each other. These points are linked to or associated with each other as the mutually corresponding coordinate points.

FIG. 14 shows a list of the calculative identifier positions 63 and the in-image identifier positions 61 linked to each other by the positioning finalization unit 107 in the manner described above. The in-WC-system identifier known positions 62, based on which the calculative identifier positions 63 have been calculated, are also shown in the list. The in-image identifier positions 61 are linked to the in-WC-system identifier known positions 62. At this stage, the identifiers 6 that have been captured by the imaging unit 2 but not yet identified are identified as the identifiers 6 whose positions are known. These identified identifiers 6 serve similarly to the markers 5 because the identifiers 6 are identified and their positions are known.

The primary positioning unit 104 calculates the in-WC-system imaging primary position of the imaging unit 2 based on the two markers 5. In this respect, the state in which the identifiers 6 are linked to the in-WC-system identifier known positions 62 as shown in FIG. 14 has the same effect as an increase in the number of the markers 5 from two to eighteen including the sixteen identified identifier 6*a* to 6*p*.

The positioning finalization unit 107 further performs the PnP positioning processing (Step S110). For example, the positioning finalization unit 107 performs the PnP positioning processing, based on the in-WC-system marker known positions 52, the in-WC-system identifier known positions 62, the in-image marker positions 51, and the in-image identifier positions 61.

While the primary positioning has been performed according to the P2P positioning calculation, the processing in this step can be performed as a P18P problem in which positioning is performed based on the imaging results of the eighteen three-dimensional known points, whereby the accuracy is improved.

Then, the output unit 108 outputs the results of the PnP positioning processing as the determined positioning results.

The processing unit 100 performs positioning end determination processing (Step S112).

As the positioning end determination processing, the processing unit 100 ends the positioning process when positioning is to be ended (Step S112: YES). When the positioning is not to be ended (Step S112: NO), the processing unit 100 returns the positioning process to the stage denoted by "A" in the flowchart.

In the present embodiment, the P2P positioning processing is employed in the primary positioning, and two markers 5 are used as the minimum number of markers required for the primary positioning. The minimum number of the markers 5 may be set to six, i.e., P6P may be set as the minimum requirement for the positioning. This is because the position and imaging direction of the imaging unit 2 can be derived by way of the P6P positioning. Furthermore, the present embodiment is not limited to the above-described positioning based on two or six points, and is effective for all types of PnP positioning processing.

(In-WC-System Outline Known Positions)

In the foregoing, the overall flow of the positioning process has been described with reference to the example of the in-WC-system identifier known position 62, which is the center position of the identifier 6. In the following, a case of using positions 65 around the in-WC-system identifier known position 62 (hereinafter referred to as the in-WC-system outline known positions 65) will be described in detail with reference to FIGS. 15 to 19.

Figure 15:
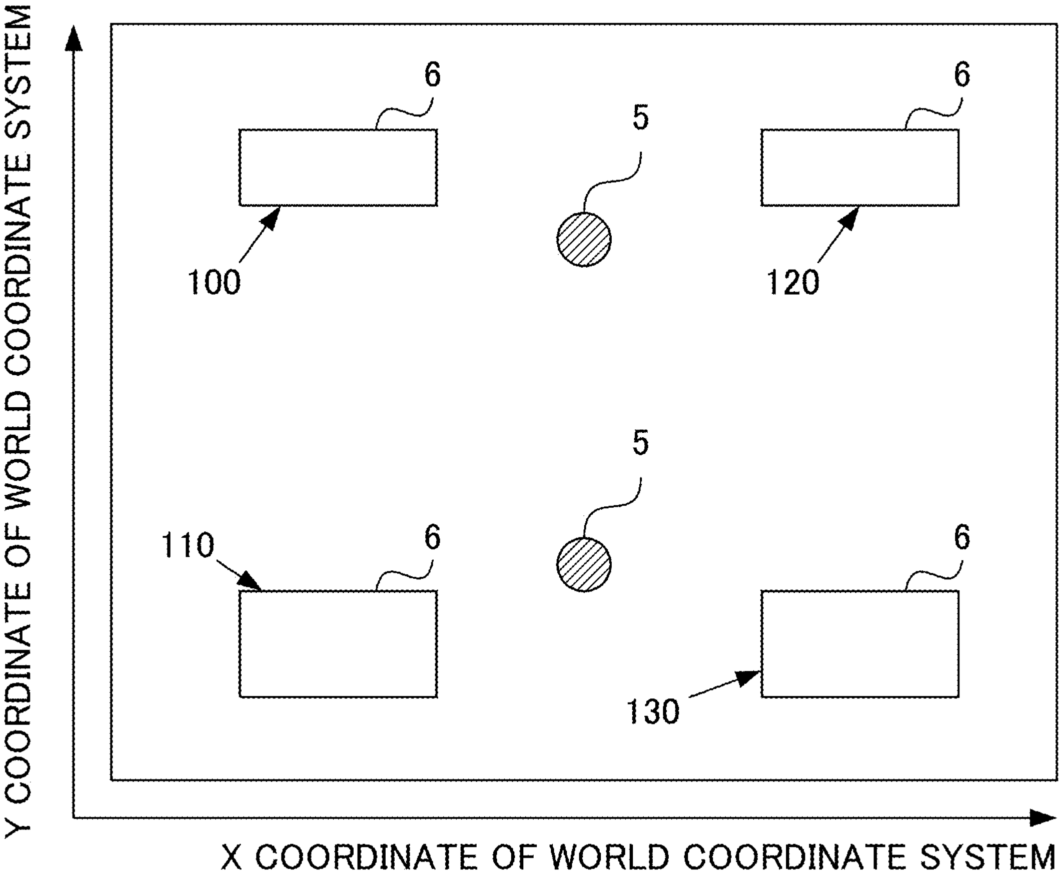
FIG. 15 is a schematic diagram illustrating an example in which identifiers according to the embodiment are quadrangle.
Figure 16A:
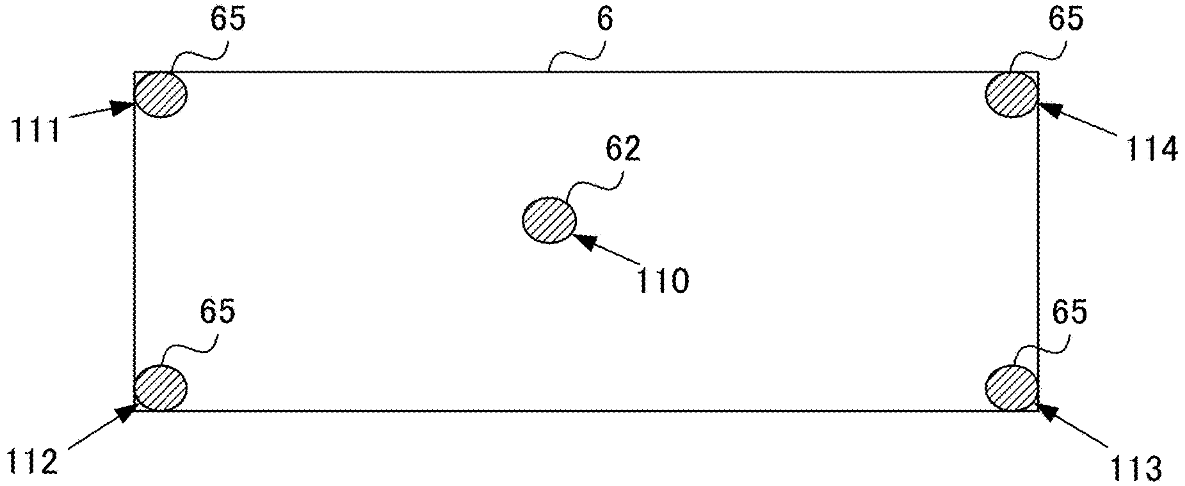
FIG. 16A is a schematic diagram illustrating an example in which vertexes of a polygonal identifier according to the embodiment are assigned with identifier positions.

FIG. 15 is a schematic diagram illustrating an example in which the identifiers 6 have a quadrangular shape and the in-WC-system outline known positions 65 are utilized. The identifiers 6 are assigned with identification numbers 100, 110, 120, and 130, respectively. For example, these identification numbers are assigned to the identifiers 6 denoted by the reference signs 6*a*, 6*b*, and the like in FIG. 5. In the figure, arrows indicate correspondence between the identifiers 6 and the identification numbers. The same applies hereinafter. FIG. 16 is a schematic diagram illustrating an example in which identifier positions are assigned to the vertexes of the identifier 6. As shown in FIG. 15, a lighting device having a rectangular shape in plan view is also usable as the identifier 6. As illustrated in FIG. 16A, processing is performed to assign vertex reference numerals 111 to 114 to the in-WC-system outline known positions 65 as the in-WC-system identifier known position 62. In FIG. 16A, arrows indicate correspondence between parts and the reference numerals. The same applies hereinafter. Thus, in the case of the quadrangular identifier 6, three-dimensional positions at five locations in total are acquired, namely the in-WC-system identifier known position 62 as the center position of the identifier 6 and the in-WC-system outline known positions 65 at the four corners.

Figure 16B:
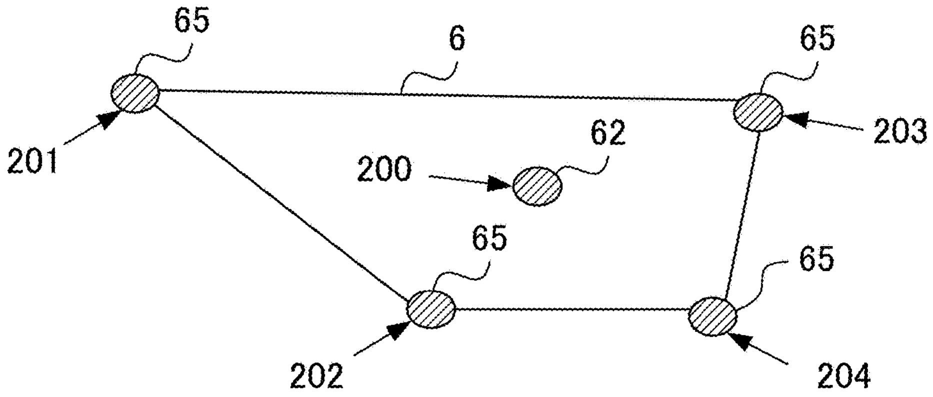
FIG. 16B is a schematic diagram illustrating an example in which vertexes of a polygonal identifier according to the embodiment are assigned with identifier positions.

FIG. 16B illustrates an identifier 6 having an asymmetric polygonal shape other than a rectangular shape, such as a trapezoid shape. The in-WC-system outline known positions 65 can be assigned also to the vertexes of this identifier 6. The in-WC-system outline known positions 65 are denoted by identification numbers 200 to 204 as the in-WC-system identifier known position 62. Unlike an identifier 6 having a square shape, the identifier 6 having such an asymmetric polygonal shape can be specified and identified with reference to the database 19, due to the peculiarity of the shape. In this case, the identifier 6 can be used in primary positioning, similarly to the marker 5. Thus, positioning process can be performed even in a case where the marker 5 is absent.

While the examples illustrated in FIGS. 16A and 16B both have a quadrangular shape, the shape is not limited thereto. For example, even in the case of a triangle, a pentagon, or a polygon with more vertexes, each vertex can be added as the in-WC-system outline known position 65, and the in-image outline position 64 of each vertex can be acquired, so that the secondary positioning can be performed.

(Processing for Extracting In-WC-System Identifier Known Positions)

Figure 17:
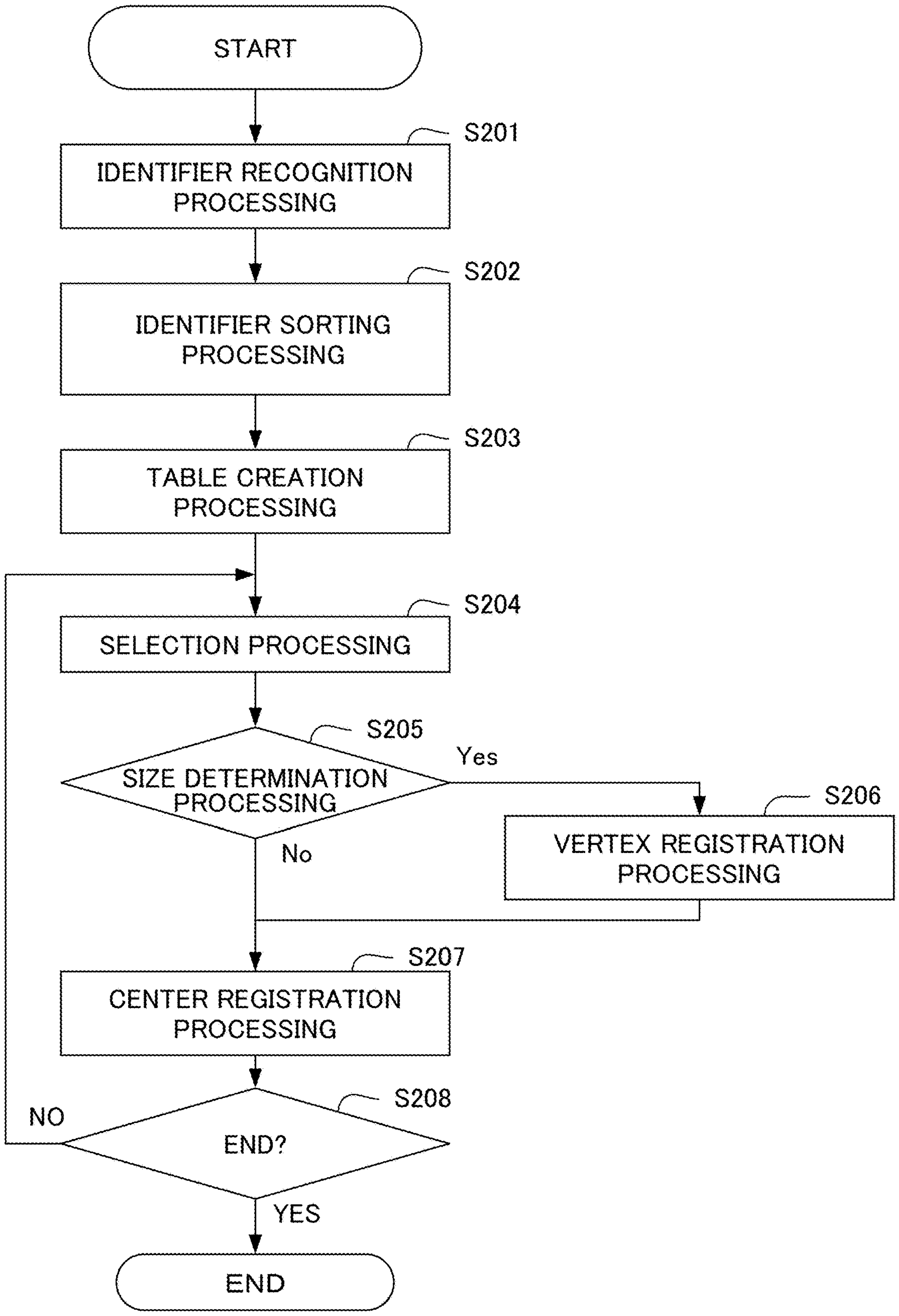
FIG. 17 is a flowchart illustrating a flow of process of acquiring in-image identifier positions in a case where the identifiers according to the embodiment have a polygonal shape.

FIG. 17 is a flowchart illustrating a flow of processing performable in a case where the identifier 6 has a polygonal shape. The processing unit 100 performs the processing to extract the in-WC-system identifier known positions 62 and the in-WC-system outline known positions 65.

Upon a start of creation of a table of the in-image identifier positions 61, the image processing unit 101 first performs identifier recognition processing (Step S201). As the identifier recognition processing, for example, the image processing unit 101 extracts regions with saturated luminance from a captured image 7, and assigns primary identification numbers to the extracted regions.

Further, the image processing unit 101 performs identifier sorting processing (Step S202). As the identifier sorting processing, for example, the image processing unit 101 performs sorting based on the shapes of the extracted regions. The image processing unit 101 sorts out, for example, an elliptic shape and a quadrangular shape, and excludes shapes overlapping with the edge of the image.

Subsequently, the image processing unit 101 performs table creation processing (Step S203). As the table creation processing, for example, the image processing unit 101 registers the extracted candidate regions in a primary table.

The identifier identification unit 106 performs selection processing (Step S204). As the selection processing, for example, the identifier identification unit 106 selects one of the regions.

The identifier identification unit 106 performs size determination processing. As the size determination processing, for example, the identifier identification unit 106 determines whether or not the size of the identifier 6 in the captured image 7 is equal to or larger than a predetermined size. The predetermined size is, for example, a size of 7×7 in terms of pixels of the captured image 7.

The size determination processing will be described with reference to FIG. 18. For example, in a case where a small image is formed due to imaging at a long distance, using points at the four corners in the image may make it more likely for an error to occur. Therefore, in the size determination process, in order to avoid performing determination that is highly likely to cause an error, it is determined whether or not the region as a candidate for the identifier 6 is of a size equal to or larger than the predetermined size.

Figure 18A:
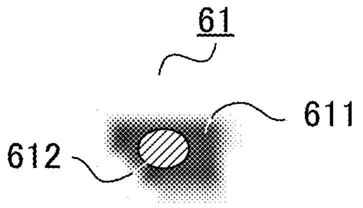
FIG. 18A is a schematic diagram illustrating an example in which an identifier according to the embodiment is of a size smaller than a predetermined size.
Figure 18B:
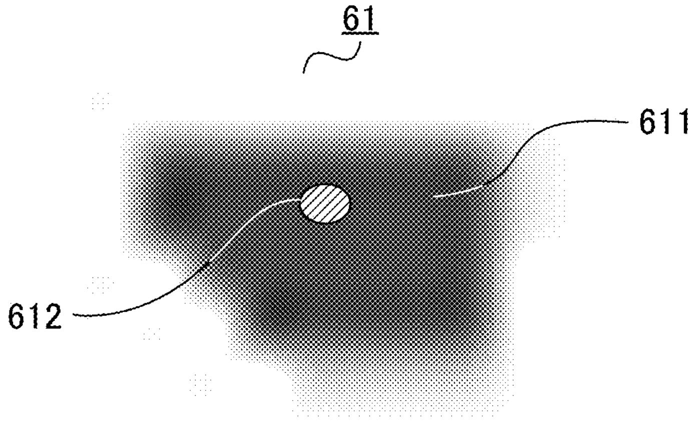
FIG. 18B is a schematic diagram illustrating an example in which a boundary of an identifier according to the embodiment is unclear.

When the extracted region has a size equal to or larger than the predetermined size (Step S205: YES), the identifier identification unit 106 performs vertex registration processing (Step S206). As the vertex registration processing, for example, the identifier identification unit 106 registers the four vertexes of the identifier 6 having a quadrangular shape, as the in-image outline positions 64. As shown in FIG. 18A, in a case where there is one candidate for the identifier 6 based on which an in-image identifier position 61 can be acquired, it is possible to use only a partial region 612 at the center of a region 611 corresponding to the candidate. There is also a case where a candidate appears as a polygon as shown in FIG. 18B, but the boundary is blurred and the vertexes are not clear. Also in this case, a partial region 612 at the center of the region 611 corresponding to the candidate may be used.

Subsequently, the identifier identification unit 106 performs center registration processing (Step S207). As the center registration process, for example, the identifier identification unit 106 registers the center of the extracted region as the in-image identifier position 61, regardless of the size of the extracted region.

The processing unit 100 performs process end determination processing (Step S208).

When the process is not to be ended (Step S208: NO), the processing unit 100 returns the positioning process to Step S204. When the process is to be ended (Step S208: YES), the processing unit 100 ends the creation of the list of the in-image identifier positions 61.

FIG. 19 illustrates an example in which the in-WC-system outline known positions 65 are identified and registered as the in-WC-system identifier known positions 62 at the positions of the vertexes of the polygonal identifier 6 described above. The number of tens and the number of hundreds are adopted for the center position, and the number of units is adopted for the in-WC-system outline known position 65 corresponding to the vertex.

In the present invention, the polygonal identifiers 6 disposed in an environment can be used in the positioning process. When indoor lighting devices as the identifiers 6 are normally captured in an image, the luminance appears as a saturated region in the image. Therefore, to perform the first extraction of candidates for the identifier regions, it is only necessary to carry out simple binarizing processing using a saturation value, thereby obtaining highly stable image signals. In addition, lighting devices are generally disposed in a space with good visibility, and many of the lighting devices have a simple shape such as a round shape or a square shape, and can be suitably used as the identifiers 6 of the present embodiment. The identifier 6 is not limited to such a lighting device, and may be any other device or object as long as it can be detected stably by a simple method in a scene of use. For example, it is conceivable to employ a high-chroma object or the like disposed in a low-chroma environment with good visibility because binarizing processing can be performed with a specific high-chroma threshold value.

The polygonal identifiers 6 are adopted and the in-WC-system outline known positions 65 as one form of the in-WC-system identifier known positions 62 are used in the PnP positioning. This feature makes it possible to increase the "n" of the PnP position processing, without having to increase the number of lighting devices.

In a case where the identifier 6 in the captured image 7 is of a size smaller than the predetermined size, the processing unit 100 included in the information processing apparatus 10 acquires the center position of the identifier 6 and acquires the in-image identifier position 61 based on the center position.

Consequently, the in-WC-system identifier known position 62 for use in the PnP positioning processing is optimized, thereby achieving higher positioning accuracy.

(Modifications of Marker)

In the positioning process described above, the markers 5 adapted to be identified are used in one primary positioning method. The primary positioning may be performed by other means. Examples of such means will be briefly described below.

In a case where the positioning finalization unit 107 has been just completed the PnP positioning processing, the current position can be estimated from a difference based on a past position and a latest vector, and the current position can be defined as the in-WC-system imaging primary position. Nevertheless, this process is not available in an initial state.

An image of a two-dimensional code is captured by the imaging unit 2, and primary setting of the position of the imaging unit 2 can be performed based on the code and the imaging angle of the imaging unit 2. For the positioning performed by recognizing such a two-dimensional code or the like, it is preferable to display the two-dimensional code in a relatively large area on an imaging screen.

For example, an infrared sensor may be provided as a specific point, and primary setting of the position of the imaging unit 2 can be performed based on detection of passage through the specific point. In a case where the imaging unit 2 is mounted to the movable body 3, and it is guaranteed that the starting point of the movable body 3 is the specific point, primary setting of the position of the imaging unit 2 can be performed based on the position of the specific point. The information regarding the specific point may be stored as imaging unit installation parameters 24 in the database 19 illustrated in FIG. 4. For example, in a case where the movable body 3 starts from a charge station, if the identification number of the charge station is known, primary setting of the position of the imaging unit 2 can be performed. For example, the elevation angle, the focal length, the presence or absence of the autofocus function of the imaging unit 2 may be stored as the imaging unit internal parameters 23 in the database 19 illustrated in FIG. 4. Two or more of the various means described above may be combined with each other. However, the method of using the marker 5, which is adapted to be identified, in particular, based on the color change signal of the light emitter, is suitable for performing the primary positioning with relatively high accuracy in a large area.

As described above, the present invention is not limited to a marker that performs optical communication by changing the light emission modes as in the case of the markers 5 of the above embodiment, and other types of markers 5 can be used as described in the modifications.

Next, an example of processing performable after the in-WC-system identifier known positions 62 are identified in the captured image 7 will be described.

FIG. 20 more specifically illustrates positioning processing that is performed using the ceiling 4 on which the markers 5 and the identifiers 6 are disposed. The identifiers 6 have been identified, like the markers 5. In the following description, the primary positioning unit 104 uses the in-WC-system identifier known positions 62 for the primary positioning, like the markers 5.

For the sake of convenience, FIG. 20 is based on an assumption that the markers 5 and the identifiers 6 are arranged in an orderly manner, and the imaging unit 2 is provided orthogonally to the markers 5 and the identifiers 6. In the figure, the quadrangular region indicates an imaging range corresponding to the captured image 7. FIG. 20A illustrates an initial state. The markers 5 are captured in the image and the in-image marker positions 51 are recognized. The in-image identifier positions 61 are acquired. The markers 5 are indicated by black filled-in squares in FIG. 20A, which means they have been identified.

Figure 20A:
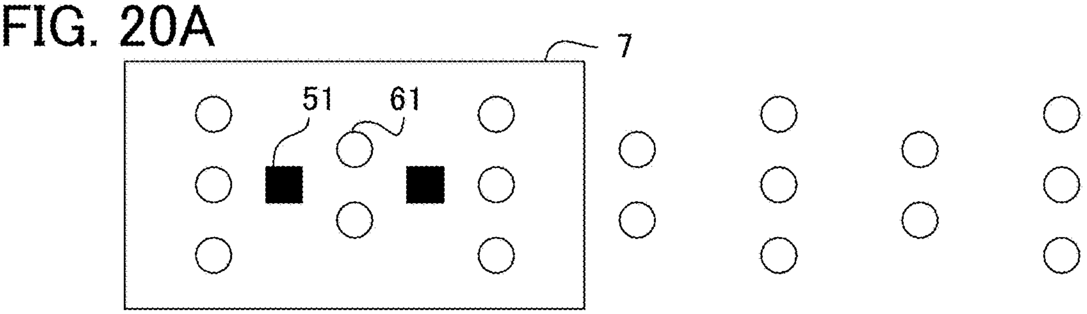
FIG. 20A is a conceptual diagram illustrating an example in which identifiers in a captured image are identified by being associated with in-WC-system identifier known positions, and the identified in-WC-system identifier known positions are used as markers.
Figure 20B:
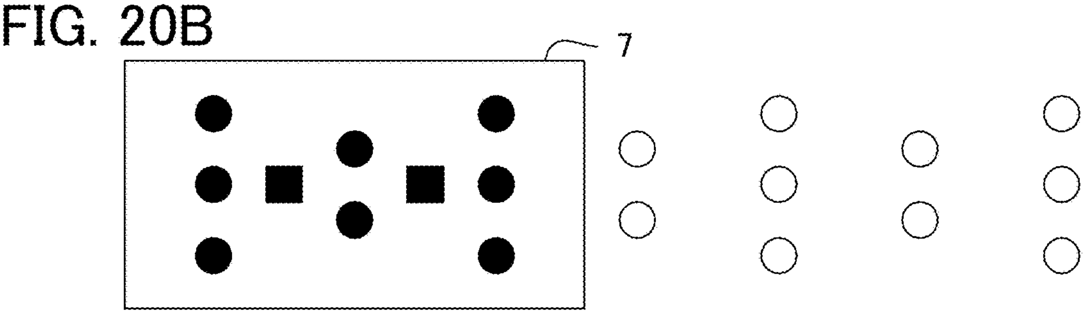
FIG. 20B is a conceptual diagram illustrating an example in which identifiers according to an embodiment in a captured image are identified by being associated with in-WC-system identifier known positions, and the identified in-WC-system identifier known positions are used as markers.

The in-WC-system imaging primary position of the imaging unit 2 is calculated based on the in-image marker positions 51 and the in-WC-system marker known positions 52. Then, the calculative identifier positions 63 are calculated on the assumption that the identifiers 6 located at the in-WC-system identifier known positions 62 are captured in an image from the in-WC-system imaging primary position. In other words, projection calculation processing is performed. Thereafter, for example, by associating the neighboring points, the identifiers 6 from which the in-image identifier positions 61 originate are linked to the in-WC-system identifier known positions 62 on which the calculation is based. Thus, the identifiers 6 shown in the captured image 7 are recognized as identified identifiers 6 whose positions are known. Here, the identifiers 6 serve as identifiable indicators, similarly to the markers 5. To describe this situation, the identifiers 6 indicated by hollow circles in FIG. 20A are now indicated by black filled-in circles in FIG. 20B.

Figure 20C:
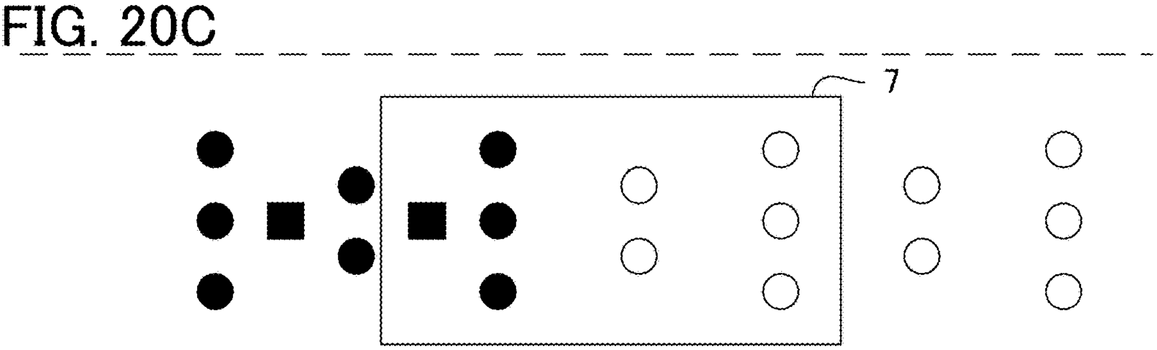
FIG. 20C is a conceptual diagram illustrating an example in which identifiers according to the embodiment in a captured image are identified by being associated with in-WC-system identifier known positions, and the identified in-WC-system identifier known positions are used as markers.
Figure 20D:
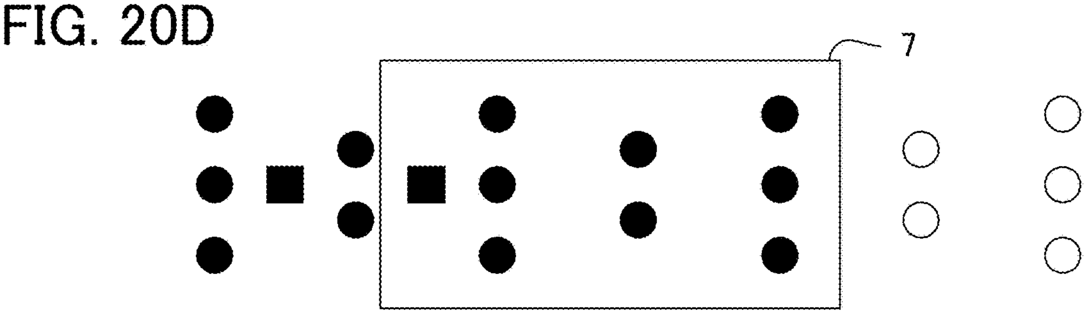
FIG. 20D is a conceptual diagram illustrating an example in which identifiers according to the embodiment in a captured image are identified by being associated with in-WC-system identifier known positions, and the identified in-WC-system identifier known positions are used as markers.

When the movable body 3 continuously moves from this state, the images 7 captured by the imaging unit 2 change as illustrated in FIG. 20C. Here, image processing is performed to maintain the link between the in-image identifier positions 61 in the captured image 7 and the in-WC-system identifier known positions 62. In FIG. 20C, the in-image marker position 51 and the in-image identifier positions 61 are maintained for the marker 5 and the identifiers 6 indicated by the respective filled-in figures, which means that they are identified. Since the four black filled-in figures in the captured image 7 shown in FIG. 20C have been identified, they can be used for the primary positioning of the imaging unit 2, similarly to the in-image marker positions 51 shown in FIG. 20A. A comparison with calculative identifier positions 63 is then made, so that the in-image identifier positions 61 in the captured image 7 in FIG. 20C are newly linked to the in-WC-system identifier known positions 62, and come to serve as identifiable indicators, similarly to the markers 5. To describe this state, the identifiers 6 indicated by hollow circles in FIG. 20C are now indicated by black filled-in circles in FIG. 20D.

Figure 20E:
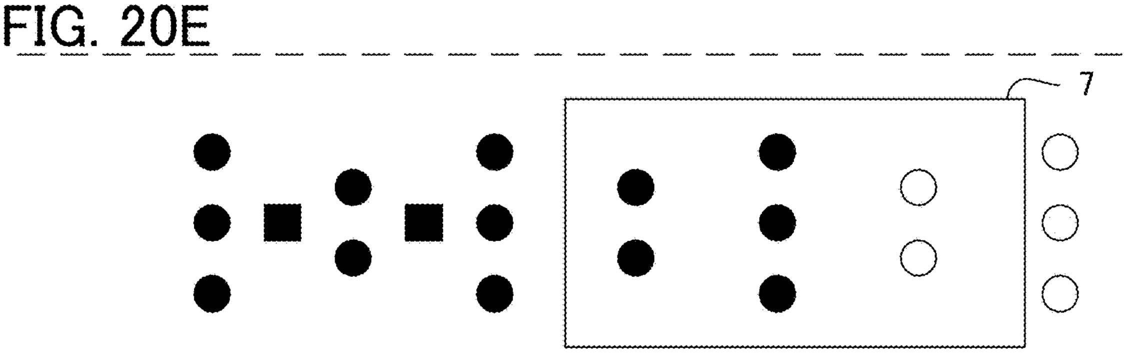
FIG. 20E is a conceptual diagram illustrating an example in which identifiers according to the embodiment in a captured image are identified by being associated with in-WC-system identifier known positions, and the identified in-WC-system identifier known positions are used as markers.

The process described above is repeated. FIG. 20E illustrates an image 7 captured when the movable body 3 has further moved from the state corresponding to FIG. 20C. At this point in time, the in-image marker positions 51 originating from the markers 5 are not included in the captured image 7. The primary positioning unit 104 performs primary positioning of the imaging unit 2 based on the identified identifiers 6, and the positioning finalization unit 107 determines the positioning of the imaging unit 2.

Thus, the above-described configuration, in which the positions of the identifiers 6 are continuously measured and identified subsequent to the identification of the markers 5 disposed only in the vicinity of the initial position of movement, makes it practical to install the markers 5 in the initial position even in a large area. That is, subsequent to the processing based on the markers 5, even if the markers 5 are not included in the captured images 7, the identifiers 6 included in the captured images 7 allow for deriving the in-WC-system imaging unit determined position of the imaging unit 2.

(Effects of the Embodiment)

The information processing apparatus 10 includes the processing unit 100 that acquires, based on the image 7 captured by the imaging unit 2 and including the identifier 6 disposed in a space, a plurality of in-image outline positions 64 in the image coordinate system 71, from the outline of the shape of the identifier 6 by way of image processing, and determines a position of the imaging unit 2, based on the in-image outline positions 64 and the in-WC-system outline known positions 65 indicating known three-dimensional positions on the outline of the shape of the identifier 6 in the world coordinate system 70.

Due to this feature, the information processing apparatus 10 derives highly accurate positioning results based on only the existing identifier 6 or an existing lighting device. The information processing apparatus 10 does not experience difficulty in highly accurately tracking, which can be caused in the case of using a radio wave. Further, unlike Visual-SLAM and LiDAR-SLAM, the information processing apparatus 10 does not cause a disadvantage that determination of positioning is less easily assured, and is free from a problem of loop closing. As a result, a practical positioning system can be constructed.

The processing unit 100 included in the information processing apparatus 10 acquires, as the in-image outline positions 64, the vertex positions of the shape or/and the center position derived from the vertex positions of the shape.

The use of the polygonal lighting device in positioning process provides increase in flexibility and accuracy of the positioning process. The minimum number of vertexes is three, which is the number of the vertexes of a triangle, and is larger than two, which is the minimum number required for the PnP positioning processing. Further, since the center position is acquired, at least one position serving as a reference of the positioning process is provided.

The processing unit 100 included in the information processing apparatus 10 determines the position of the imaging unit 2, based on the in-image outline positions 64 of the identifier 6 that has an asymmetric shape.

Thus, a look-up of the asymmetric shape is performed on the database 19, and the in-image outline positions 64 are associated with the in-WC-system outline known positions 65, whereby the orientation of the imaging unit 2 can be specified and the PnP positioning processing can be performed even without the markers 5.

The processing unit 100 included in the information processing apparatus 10 determines the position of the imaging unit, based on the in-image outline positions 64 of the identifier 6 whose size on the captured image 7 is equal to or larger than a predetermined size.

This feature allows the coordinates for positioning on the captured image 7 to have a solution equal to or greater than a certain solution, thereby achieving more reliable positioning accuracy.

In a case where the identifier 6 on the captured image 7 is of a size smaller than the predetermined size, the processing unit 100 included in the information processing apparatus 10 acquires the center position of the identifier 6 and determined the position of the imaging unit based on the center position.

This feature allows the coordinates for positioning on the captured image 7 to have a solution equal to or greater than a certain solution, thereby achieving more reliable positioning accuracy. Adopting the center position allows for provision of at least one position for the positioning process, thereby improving the positioning accuracy.

The processing unit 100 included in the information processing apparatus 10 acquires an in-WC-system imaging primary position of the imaging unit 2, based on the in-image outline positions 64 and the in-WC-system outline known positions 65 of the identifier 6, associates the in-image identifier position 61 indicating a position of the identifier 6 on the captured image 7 with the in-WC-system identifier known position 62 indicating a known three-dimensional position of the identifier 6 in the world coordinate system 70, based on the in-WC-system imaging primary position and the in-WC-system identifier known position 62, and determines the position of the imaging unit 2, based on the in-image identifier position 61 and the in-WC-system identifier known position 62.

This feature increases the number "n" of the PnP position process, i.e., the number of reference positions for positioning processing, thereby improving the position accuracy.

A program according to the present embodiment causes a computer to perform functions including: acquiring, based on the image 7 captured by the imaging unit 2 and including the identifier 6 disposed in a space, a plurality of in-image outline positions 64 in the image coordinate system 71, from the outline of the shape of the identifier 6 by way of image processing, and determining a position of the imaging unit 2 based on the in-image outline positions 64 and the in-WC-system outline known positions 65 indicating known three-dimensional positions on the outline of the shape of the identifier 6 in the world coordinate system 70.

Thus, the present embodiment provides the program that derives highly accurate positioning results based on only the existing identifier 6 or an existing lighting device.

The present embodiment provides a positioning method including: acquiring, based on the image 7 captured by the imaging unit 2 and including the identifier 6 disposed in a space, a plurality of in-image outline positions 64 in the image coordinate system 71, from the outline of the shape of the identifier 6 by way of image processing, and determining a position of the imaging unit 2 based on the in-image outline positions 64 and the in-WC-system outline known positions 65 indicating known three-dimensional positions on the outline of the shape of the identifier 6 in the world coordinate system 70.

Thus, the present embodiment provides the method of deriving highly accurate positioning results based on only the existing identifier 6 or an existing lighting device.

In the foregoing, the positioning process based on the identifier 6 has been described. It should be noted that the embodiments and modifications described above are not intended to limit the present invention, and the present invention encompasses improvements and the like within the range where the object of the present invention can be achieved.

Further, in the above embodiments, the information processing apparatus 10 to which the present invention is applied has been described by referring to the forklift as an example of the movable body 3, but the present invention is not limited thereto. For example, the present invention can be applied to general electronic apparatuses having an image processing function. Specifically, the present invention can be applied to, for example, a notebook personal computer, a portable navigation device, a mobile phone, a smartphone, and a portable game console.

The processing sequence described above can be executed by hardware, and can also be executed by software. In other words, the functional configuration of FIG. 4 is merely an illustrative example, and the present invention is not particularly limited thereto. More specifically, the types of functional blocks employed to realize the above-described functions are not particularly limited to the examples shown in FIG. 4, so long as the information processing apparatus 10 can be provided with the functions enabling the aforementioned processing sequence to be executed in its entirety.

In addition, a single functional block may be configured by a single piece of hardware, a single installation of software, or a combination thereof. The functional configurations of the present embodiment are realized by the processor 11 executing arithmetic processing, and the processor 11 that can be used for the present embodiment includes a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be distributed separately from an apparatus main body to supply the program to a user, but also can be constituted by a storage medium or the like supplied to the user in a state incorporated in the apparatus main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) disc or the like. The magnetic optical disk is composed of an MD (Mini-Disk) or the like. The storage medium supplied to the user in a state incorporated in the apparatus main body in advance is constituted by, for example, the ROM 12 in which the program is recorded or a hard disk (not shown).

It should be noted that, in the present specification, the steps defining the program recorded in the storage medium include not only the processing executed in a time series following this order, but also processing executed in parallel or individually, which is not necessarily executed in a time series. Further, in the present specification, the terminology of the system means an entire apparatus including a plurality of apparatuses and a plurality of units.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An information processing apparatus comprising:

one or more processors configured to:

acquire, based on an image captured by an imaging unit existing in a predetermined space and including an asymmetrical identifier disposed in the predetermined space, a position of each vertex of a plurality of vertexes of an outline of a shape of the identifier in an image coordinate system, and determine a position of the imaging unit, based on the plurality of positions on the outline of the shape of the identifier in the image coordinate system and positions corresponding to the plurality of vertexes on the outline of the shape of the identifier in a world coordinate system, wherein the one or more processors determine the position of the imaging unit, based on a plurality of positions corresponding to the vertexes on the outline of the asymmetric shape of the identifier, whereby the identifier can be uniquely identified, determine whether a size of the identifier in the image captured is equal to or larger than a predetermined value, determine the position of the imaging unit based on the plurality of positions of the vertexes on the outline of the shape of the identifier in the image coordinate system, in a case where the size of the identifier is determined to be equal to or larger than the predetermined value, and acquire the center position of the identifier and determine the position of the imaging unit based on the center position, in a case where the size of the identifier is determined to be smaller than the predetermined value.

2. The information processing apparatus according to claim 1, wherein the one or more processors acquire, as the positions on the outline of the shape of the identifier in the image coordinate system, either positions of vertexes of the shape of the identifier or a center position derived from the positions of the vertexes.

3. The information processing apparatus according to claim 1, wherein the one or more processors acquire a primary position of the imaging unit, based on the positions of the vertexes on the outline of the shape of the identifier in the image coordinate system and the positions of the vertexes on the outline of the shape of the identifier in the world coordinate system, associate, based on the primary position of the imaging unit and a position of the identifier in the world coordinate system, a position of each of the vertexes of the identifier in the image coordinate system with the position of each of the vertexes of the identifier in the world coordinate system, and determine the position of the imaging unit, based on the position of the identifier in the image coordinate system and the position of the identifier in the world coordinate system associated with each other.

4. A non-transitory computer-readable storage medium storing a program that causes a computer to perform operations comprising:

acquiring, based on an image captured by an imaging unit existing in a predetermined space and including an asymmetrical identifier disposed in the predetermined space, a position of each vertex of a plurality of vertexes of an outline of a shape of the identifier in an image coordinate system;

determining a position of the imaging unit, based on the plurality of positions on the outline of the shape of the identifier in the image coordinate system and positions corresponding to the plurality of vertices on the outline of the shape of the identifier in a world coordinate system;

determining whether a size of the identifier in the image captured is equal to or larger than a predetermined value;

determining the position of the imaging unit based on the plurality of positions of the vertexes on the outline of the shape of the identifier in the image coordinate system, in a case where the size of the identifier is determined to be equal to or larger than the predetermined value; and acquiring the center position of the identifier and determining the position of the imaging unit based on the center position, in a case where the size of the identifier is determined to be smaller than the predetermined value.

5. A positioning method comprising:

acquiring, based on an image captured by an imaging unit existing in a predetermined space and including an asymmetrical identifier disposed in the predetermined space, a position of each vertex of a plurality of vertexes of an outline of a shape of the identifier in an image coordinate system;

determining a position of the imaging unit, based on the plurality of positions on the outline of the shape of the identifier in the image coordinate system and positions corresponding to the plurality of vertexes on the outline of the shape of the identifier in a world coordinate system;

determining whether a size of the identifier in the image captured is equal to or larger than a predetermined value;

determining the position of the imaging unit based on the plurality of positions of the vertexes on the outline of the shape of the identifier in the image coordinate system, in a case where the size of the identifier is determined to be equal to or larger than the predetermined value; and acquiring the center position of the identifier and determining the position of the imaging unit based on the center position, in a case where the size of the identifier is determined to be smaller than the predetermined value.

6. A method comprising:

acquiring, based on an image captured by an imaging unit existing in a predetermined space and including an asymmetrical identifier disposed in the predetermined space, a position of each vertex of a plurality of vertexes of an outline of a shape of the identifier in an image coordinate system, determining a position of the imaging unit, based on the plurality of positions on the outline of the shape of the identifier in the image coordinate system and positions corresponding to the plurality of vertexes on the outline of the shape of the identifier in a world coordinate system, wherein the position of the imaging unit is determined, based on a plurality of positions corresponding to the vertexes on the outline of the asymmetric shape of the identifier, whereby the identifier can be uniquely identified, determining whether a size of the identifier in the image captured is equal to or larger than a predetermined value, determining the position of the imaging unit based on the plurality of positions of the vertexes on the outline of the shape of the identifier in the image coordinate system, in a case where the size of the identifier is determined to be equal to or larger than the predetermined value, and acquiring the center position of the identifier and determining the position of the imaging unit based on the center position, in a case where the size of the identifier is determined to be smaller than the predetermined value.

7. An information processing apparatus comprising:

one or more processors configured to:

acquire, based on an image captured by an imaging unit existing in a predetermined space and including an asymmetrical identifier disposed in the predetermined space, a position of each vertex of a plurality of vertexes of an outline of a shape of the identifier in an image coordinate system, and determine a position of the imaging unit, based on the plurality of positions on the outline of the shape of the identifier in the image coordinate system and positions corresponding to the plurality of vertexes on the outline of the shape of the identifier in a world coordinate system, wherein, the one or more processors are configured to determine whether a size of the identifier in the image is equal to or greater than a predetermined value, and, when it is determined that the size of the identifier is equal to or greater than the predetermined value, determine a position of the imaging unit based on a plurality of positions of an outline of the identifier in an image coordinate system, and when it is determined that the size of the identifier is less than the predetermined value, acquire a center position of the outline and determine the position of the imaging unit based on the center position.

* * * * *